United States Patent

Cane et al.

[11] Patent Number: 5,999,203
[45] Date of Patent: Dec. 7, 1999

[54] PRINTER ASSEMBLY WITH EASILY LOADED PAPER CARTRIDGE

[75] Inventors: Michael Rodger Cane, Cambridge; Michael Andrew Beadman, Royston, both of United Kingdom

[73] Assignees: TTP Group, PLC, Hertfordshire; Paul Priestman and Nigel Goode, London, both of United Kingdom

[21] Appl. No.: 08/516,628

[22] Filed: Aug. 18, 1995

[51] Int. Cl.[6] .................................. B41J 3/00; B41J 3/36; B41J 3/44

[52] U.S. Cl. .......................... 347/171; 347/222; 396/429; 358/906; 358/909.1

[58] Field of Search ..................................... 358/296, 906, 358/909.1; 400/691, 692, 693; 396/429; 347/222, 171

[56] References Cited

U.S. PATENT DOCUMENTS 5,353,098  10/1994  Lim ........................................ 355/200

FOREIGN PATENT DOCUMENTS

| 0 084 630 A1 | 8/1983 | European Pat. Off. | ......... B41J 35/00 |
| 0 441 038 A2 | 8/1991 | European Pat. Off. | ....... H04N 1/100 |
| 0 472 471 A3 | 2/1992 | European Pat. Off. | ......... B41J 17/32 |
| 0 473 132 A3 | 3/1992 | European Pat. Off. | ......... B41J 17/32 |
| 0 659 572 A2 | 6/1995 | European Pat. Off. | ......... B41J 19/18 |
| 2 045 490 | 10/1980 | United Kingdom | ............. G01D 7/00 |
| WO 95/16323 | 6/1995 | WIPO | ................ H04N 1/21 |

OTHER PUBLICATIONS

Copy of Notification of Transmittal of the International Search Report or the Declaration, copending foreign application PCT/US96/12458, filling date Feb. 8, 1996.

*Primary Examiner*—Huan Tran
*Attorney, Agent, or Firm*—Andrus, Sceales, Starke & Sawall

[57] ABSTRACT

An electronic imaging camera includes a printer assembly for providing instant images. Selected special effects may be applied to the images prior to printing. The printer assembly includes a thermal print head and a paper advance roller. A replaceable preloaded paper cartridge is provided for easy replacement of the paper. The housing of the paper cartridge acts as a printing platen for the print head, and rollers in the cartridge maintain friction between the paper and the paper advance roller of the printer assembly. A pivoting print head cover prevents a user from inadvertently coming into contact with the print head when the paper cassette is removed. A rotary encoder gear includes a plurality of spaced lugs which block emissions from a light emitting diode from reaching a phototransistor. As the encoder gear rotates in synchronization with the print head, the phototransistor produces a series of electrical pulses indicative of the print head speed. These pulses are fed back to the printer control circuits to adjust the print head speed. An extended tab on the print head carrier extends into the light path between the light emitting diode and the phototransistor when the print head is in the home position. Accordingly, the same LED/phototransistor combination is used for detecting print head speed and for registering the mechanical home position of the print head.

20 Claims, 19 Drawing Sheets

PRINTER ASSEMBLY WITH EASILY LOADED PAPER CARTRIDGE

BACKGROUND OF THE INVENTION

The present invention relates generally to an improved printer assembly and, more specifically, to a printer assembly having an easily loaded paper cartridge. The preferred embodiment of the present invention is particularly adapted for use in applications utilizing printers having a replaceable cartridge that carries a roll of paper for use by the printer.

A number of devices in common usage, such as hand-held electronic imaging cameras, printing calculators, portable computer printers, facsimile machines, and the like, require a roll of paper that must be loaded into the printer mechanism prior to use. This roll must be changed whenever the paper is completely, or almost completely, expended. Unfortunately, threading the paper through rollers in the printer often makes loading a new paper roll into the printer mechanism a difficult and frustrating process. For children, elderly and disabled persons, the task may become nearly impossible.

An instant special effects electronic camera that provides an image on thermally sensitive paper is disclosed in PCT Application No. WO 95/16323 published Jun. 15, 1995. Other electronic cameras with printer devices are shown, for example, in U.S. Pat. No. 4,074,324 to Barrett, U.S. Pat. No. 4,262,301 to Erlichman, published European Patent Application No. 574,581 to King Jim Co., published PCT Application No. WO 92/11731 to Eastman Kodak Co., and published European Application No. 398,295 to Minolta Camera. The camera disclosed in PCT Application No. WO 95/16323 is particularly well suited for use by children. As a result, simplicity and ease of use are primary concerns. Thus, it is desirable to provide the camera with a printer mechanism that may be easily loaded with paper.

It is a primary objective of the present invention to overcome the described disadvantages of the prior art as well as other prior shortcomings, and to provide an improved printer assembly that may be easily loaded with paper. It is a further objective of the present invention to provide a simple and easy to use electronic imaging camera especially adapted for children.

BRIEF SUMMARY OF THE INVENTION

In one aspect of the present invention, a printer assembly is provided which is particularly well suited for use by children, elderly persons, and persons having limited dexterity. In accordance with the preferred embodiment, the printer includes a print head having, for example, a matrix of thermal print head elements that are selectively activated for printing on thermally sensitive paper. A cooperating paper cartridge is provided for insertion in the printer assembly. Paper is preloaded into the paper cassette. The housing of the paper cassette, when inserted into the printer assembly, provides a platen and a roller bearing surface. The paper is arranged between the print head and the platen when the paper cassette is positioned in the printer assembly. Additionally, the roller bearing surface presses the paper against an advance roller of the printer assembly. Friction between the paper and the advance roller causes the paper to advance as the advance roller turns. When the paper is expended, the empty cartridge may be removed and a new cartridge easily inserted for further operations.

In the preferred embodiment, the print head is advanced by a DC motor driven at a relatively constant speed. The speed of the print head is controlled by reference to rotary encoder pulses fed back from an infra-red (IR) phototransistor that determines the position of the print head. The rotary encoder turns in synchronization with the DC motor, and includes a series of spaced apertures. An infra-red light emitting diode (LED) is arranged exterior to the rotary encoder, and the phototransistor is provided within the rotary encoder. As the encoder turns, light from the LED passes through the individual encoder apertures to strike the phototransistor which, in turn, produces a series of pulses indicative of the print head speed. An extended tab is provided on the print head carrier to enable the phototransistor to operate additionally as an end of line sensor. When the print head reaches the home position, the tab extends between the LED and the phototransistor, thereby ending the series of encoder speed pulses. The printer controller detects the lack of speed pulses, and registers a mechanical end of line. Thus, the print head drive signals can be synchronized with print head position without the need for a separate end of line detector.

In accordance with yet another aspect of the present invention, a low cost instant printing camera suitable for use by children is provided. In the preferred embodiment, a lens focuses an image on an image sensor including an array of photosensors that provide analog image outputs proportional to the intensity of light incident on the respective photosensors. The analog image outputs may be digitized and processed for printing. For example, contrast enhancement, magnification, dithering and data compression algorithms may be applied to prepare the data for printing. Additionally, selected special effects may be applied to the print-formatted data prior to printing. Information for a plurality of standard special effects, including processing algorithms and/or data, may be provided in read only memory (ROM) internal to the camera circuitry. Additional special effects information may be provided by optional ROM packs which may be inserted in the camera. A manual switch may be provided on the camera housing to permit a user to select specific special effects, or random selection of the special effects information may be chosen. An integral printer is provided in the camera body, and paper may be supplied by replaceable paper cassettes in accordance with the present invention. Safety of the printing assembly may be improved by providing a print head cover that covers the print head when the paper cassette is removed. The print head cover pivots out of the way upon insertion of the paper cassette.

BRIEF DESCRIPTION OF THE DRAWINGS

The objects, advantages and features of the present invention will become apparent to the skilled artisan from the following detailed description, when read in light of the accompanying drawings, in which:

FIG. 21(*b*) is a side view of the geared cam of FIG. 21(*a*);

FIG. 22(*b*) is a side view of the locking arm of FIG. 22(*a*);

FIG. 24(*b*) is a sectional end view of the encoder gear of FIG. 24(*a*);

FIG. 25(*b*) is a front view of the print head carrier of FIG. 25(*a*);

FIG. 26(*b*) is a top view of the cassette upper portion of FIG. 26(*a*);

FIG. 26(*c*) is a sectional view of the cassette upper portion taken along the vertical center line of FIG. 26(*b*);

FIG. 27(*b*) is a top view of the cassette lower portion of FIG. 27(*a*);

FIG. 27(*c*) is a bottom view of the cassette lower portion of FIG. 27(*a*);

FIG. 27(*d*) is a sectional view of the cassette lower portion taken along the vertical centerline of FIG. 27(*b*);

FIG. 28(*b*) is a side view of the print head cover of FIG. 28(*a*); and

DETAILED DESCRIPTION OF THE PREFERRED EMBODIMENTS

The present invention is principally described in connection with an instant special effects camera suitable for use by children. Although in one aspect the present invention finds particular application in such cameras, it should be appreciated that applications in other areas are also available. For example, the printing assembly of the present invention could readily be used in connection with printing calculators, portable computer printers, facsimile machines and the like.

Figure 1:
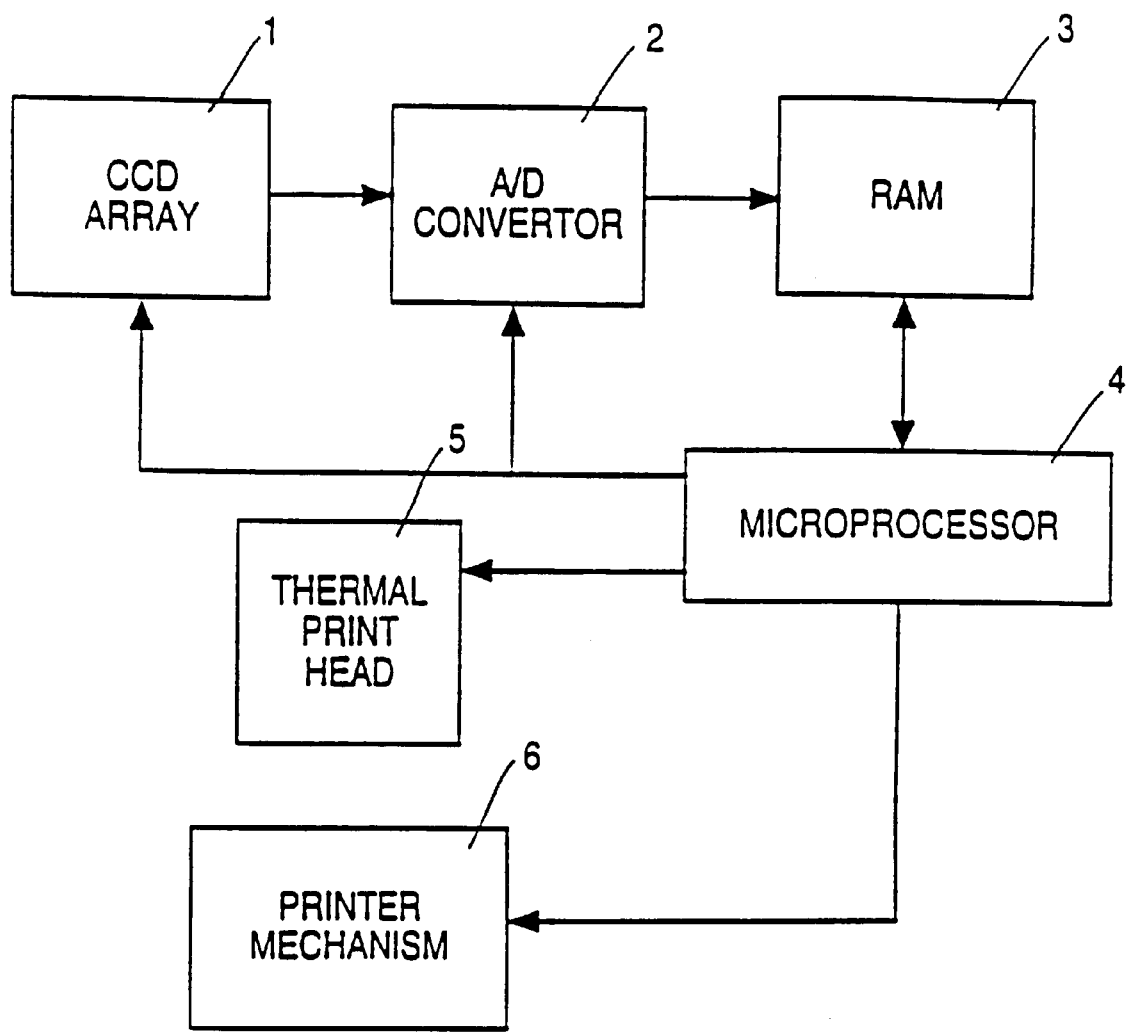
FIG. 1 is a schematic block diagram of a typical prior art electronic camera with a hard copy output.

Referring to FIG. 1, a typical electronic camera utilizes a conventional CCD array 1 to capture an image focused on the CCD array by camera optics. The analog output of the CCD array 1 is digitized by an A/D converter 2 and stored in random access memory 3. A microprocessor 4 controls a print head 5 and printer mechanism 6 to provide a hard copy of the captured image. The microprocessor 4 may optionally include software to process the image stored in the random access memory 3 to enhance the quality of the hard copy image or to produce special effects such as an outline image.

Figure 2:
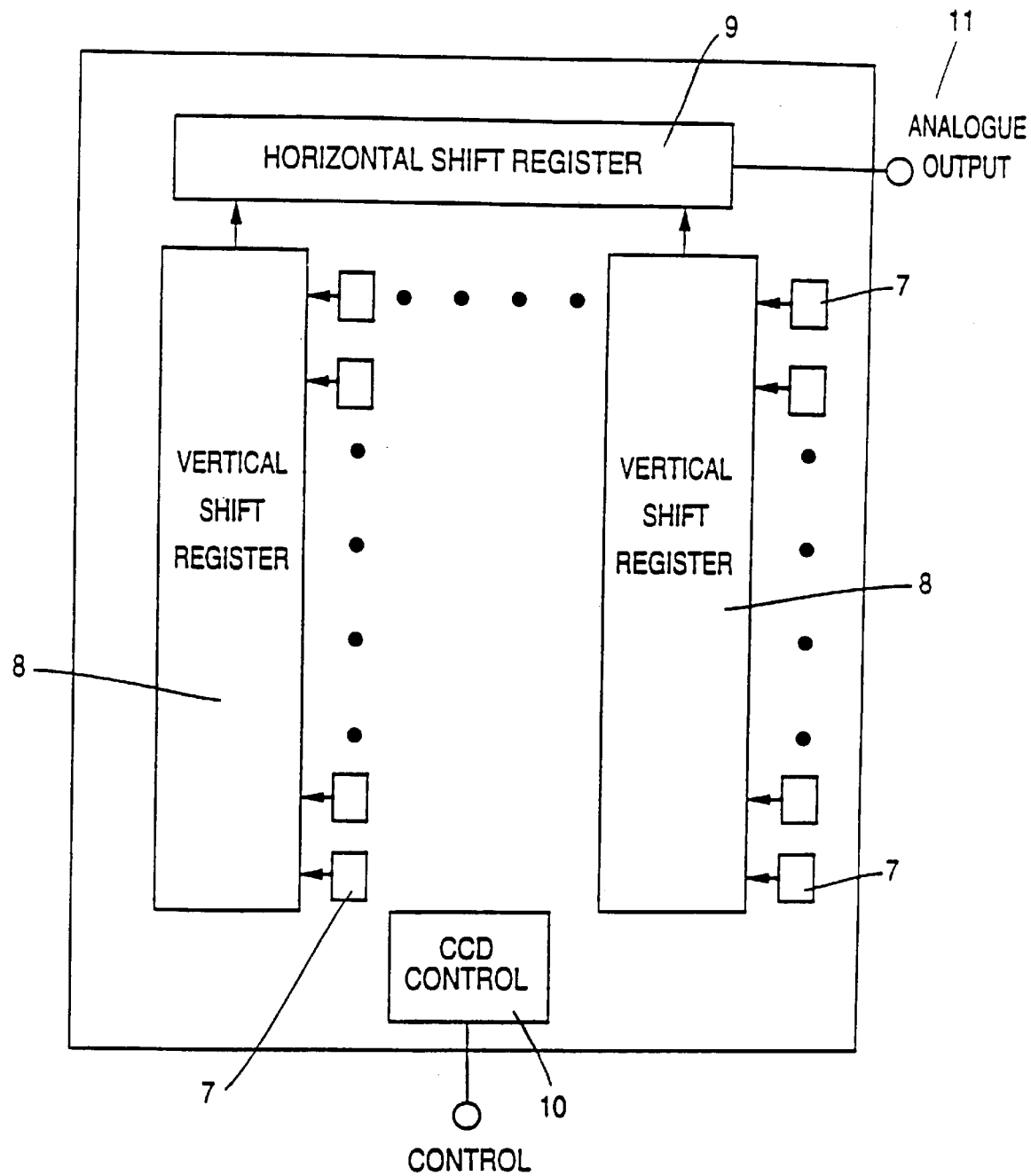
FIG. 2 is a block diagram of a conventional CCD imaging array.

As illustrated in FIG. 2, a conventional CCD array includes a plurality of photosensors 7 arranged in a matrix of rows and columns. Each photosensor represents a single pixel in the image. A vertical shift register 8 is associated with each column of photosensors. During operation, the analog image data from the photosensors 7 is gated into the vertical shift registers 8 by the CCD control 10. At this point, each vertical shift register contains one column of analog image information. Subsequently, the CCD control 10 shifts the data in the vertical shift registers 8, by one pixel in an upward direction. As a result, the topmost pixel of each column is shifted into the horizontal shift register 9 so that the horizontal shift register 9 then contains one row of image data. The contents of the horizontal shift register are then shifted to the right by one pixel at a time to the analog output terminal 11 by the CCD control 10. In this way, a row of image data is clocked out of the CCD array one pixel at a time. The horizontal shift register 9 is then filled with the next line of data by shifting the data in all the vertical shift registers 8 up one pixel. This line of pixel data is again output through the analog output terminal 11 by successive shifting of the horizontal shift register 9. This process is repeated until all lines of pixel data have been output from the analog output terminal 11.

Figure 3:
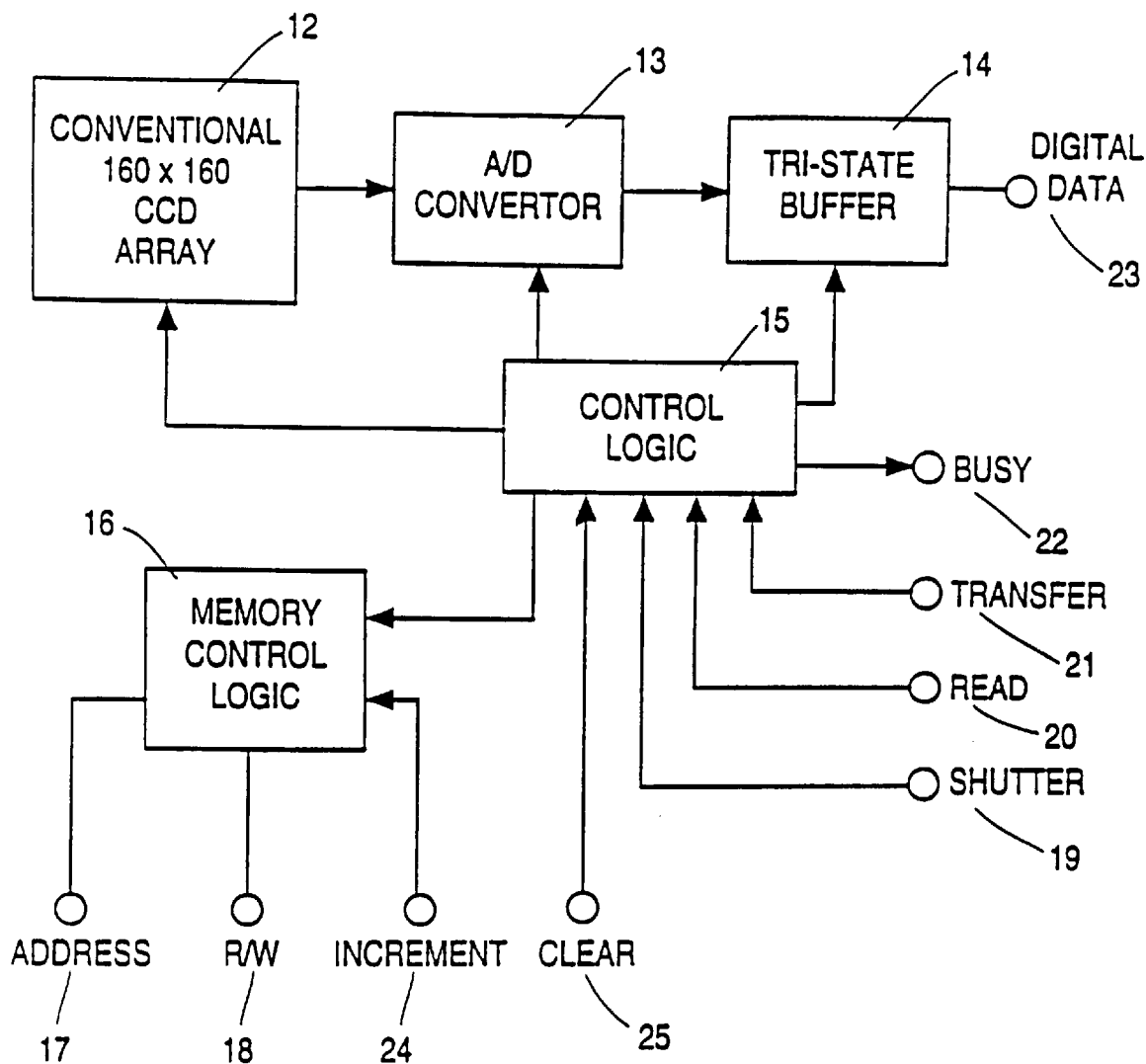
FIG. 3 is a block diagram of a custom CCD imaging array for use in an electronic camera.

Referring now to FIG. 3, the custom CCD array consists of a conventional CCD array 12 having, for example, a 160×160 pixel matrix, an analog to digital (A/D) converter 13, a tri-state buffer 14, control logic 15 and memory control logic 16. The busy signal 22, the transfer signal 21, the read signal 20 and the shutter signal 19 are used to control the operation of the device and are normally connected to an external microprocessor. The digital data signals 23, the address signals 17 and read/write signals 18 are used to transfer data to an external random access memory.

In operation, when the shutter signal 19 is asserted, the control logic 15 controls the CCD array 12 to capture a single image focused on the array by the camera optics. A filter may be provided to select light frequencies to which the photosensors are sensitive. During this process, the control logic 15 asserts the busy signal 22 to inform the external microprocessor that it is busy. When the image has been captured, the busy signal 22 is not asserted. When the transfer signal 21 is asserted, the control logic 15 transfers a predetermined number of lines of data from the CCD array 12 via the A/D converter 13 and tri-state buffer 14 to an external random access memory. The control logic 15 also controls the address in the external random access memory at which each pixel is stored by controlling the memory control logic 16 that generates the address signals 17 and the read/write signal 18 which are also connected to the external random access memory. The control logic 15 asserts the busy signal 22 during the transfer. This process may be repeated until all the data from the CCD array 12 has been transferred.

Between each transfer of a predetermined number of lines, or once all the data has been transferred to the external random access memory, the data in the external random access memory can be read by asserting the read signal 20. When the read signal 20 is asserted, the control logic 15 and the memory control logic 16 control the address signals 17 and the read/write signal 18 to access a memory location in the external random access memory. While the read signal 20 is asserted, the tri-state buffer 14 is disabled to prevent the output of the A/D converter 13 from interfacing with the data read from the external random access memory. The address from which data is read is determined by the increment signal 24 and clear signal 25. When the clear signal 25 is asserted, the address is set to zero. Each time the increment signal 24 is asserted the address is incremented by one. In this way, an external microprocessor or other control circuit can access any of the data in the external random access memory.

Figure 4:
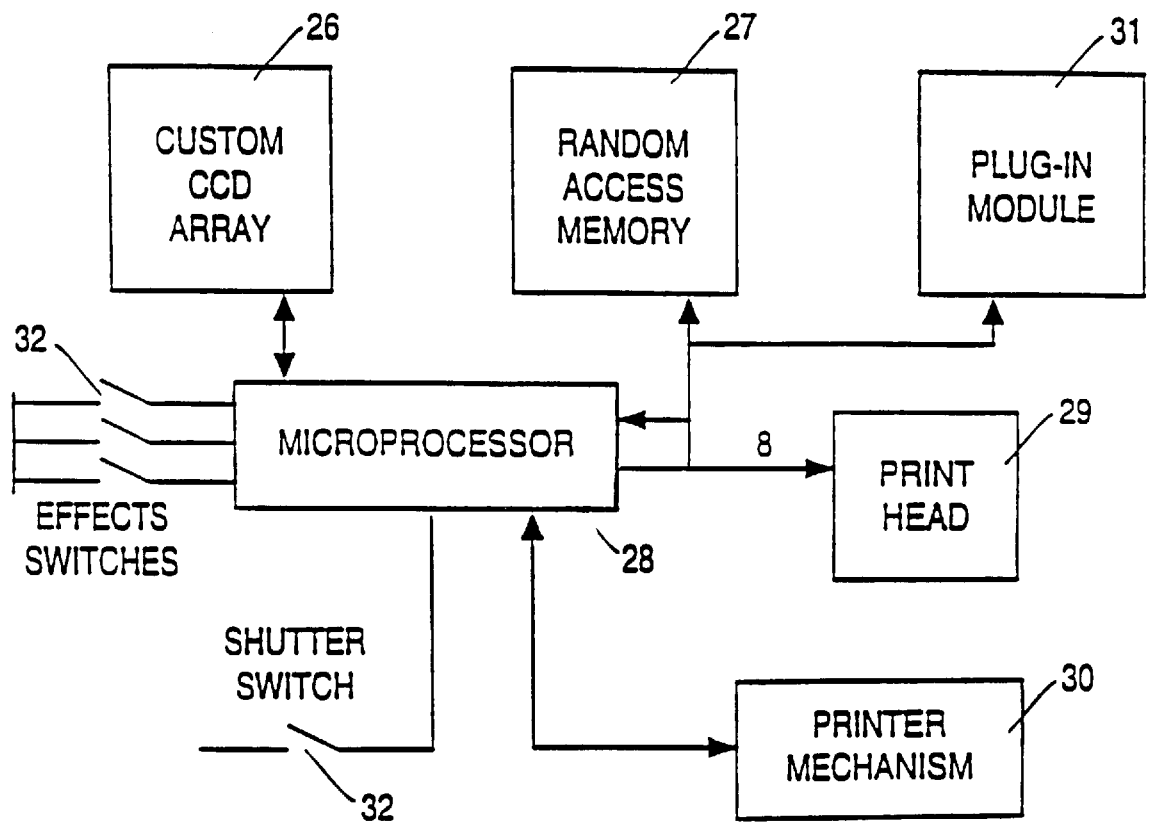
FIG. 4 is a block diagram of one embodiment of an improved electronic imaging camera using a custom CCD array.

Turning to FIG. 4, an improved electronic imaging camera includes a custom CCD array 26, such as that illustrated in FIG. 3, external random access memory 27, a microprocessor 28, a print head 29, a printer drive mechanism 30 and an optional plug-in module 31 which may comprise random access memory only, or a combination of random access memory and read-only memory.

In operation, the microprocessor 28 commands the custom CCD array 26 to capture an image when the shutter switch is operated. Once the image has been captured the custom CCD array 26 informs the microprocessor 28 that this operation is complete. When no plug-in module 31 provided, the microprocessor 28 then commands the custom CCD array 26 to transfer a predetermined number of lines of image data into the random access memory 27. The number of lines to transfer is determined by the functions the electronic imaging camera is expected to be able to perform without the benefit of the plug-in module 31. The amount of random access memory 27 is chosen to be just sufficient to hold the predetermined number of image data lines. In one embodiment, eight lines of data are transferred to the random access memory 27. Where one line of image data consists of 160 pixels, the 8 lines of image data require 8 times 160 bytes, or 1,280 bytes. A low cost 2 kilobyte random access memory 27 can therefore be used. Transferring the image 8 lines at a time allows a simple dithering algorithm to be employed which will allow an acceptable but not high quality gray-scale hard copy to be produced. As each group of 8 lines of image data is transferred, the microprocessor 28 in cooperation with custom CCD array 26 accesses the image data one byte at a time, carries out the dithering algorithm, if required, then controls the print head 29 and the printer drive mechanism 30 to produce a hard copy image. Lines are transferred eight at a time to random access memory 27, manipulated and printed by the microprocessor 28, in cooperation with the print head 29 and printer drive mechanism 30 until the entire captured image has been printed.

In another embodiment, 4 kilobytes of random access memory 27 is provided and lines of image data are transferred in a block of 16 lines or two blocks of 8 lines to the random access memory 27. This allows the microprocessor 28 to employ a more sophisticated dithering algorithm that produces a correspondingly higher quality hard copy image.

To allow additional features and functions to be provided a plug-in module 31 may be connected to the electronic imaging camera. In one embodiment, the plug-in module 31 contains 32 kilobytes of random access memory. This allows the entire image to be transferred from the custom CCD array 26 to the plug-in module 31 before the image is printed. This allows more complicated effects to be produced which require the microprocessor to be able to access the entire image or large portions of the image. In addition, because the entire image is stored, extra copies of the image can be printed. Each copy can be identical to the previous one or modified, if required by pressing one of the effects switches 32. The effects that can be selected include, but are not limited to, binary image, outline image, contrast enhancement and the addition of a "speech bubble" such as are used in newspaper cartoons.

In another embodiment, the plug-in module contains read only memory, the contents of which represent a number of pre-stored images. These pre-stored images could include picture frames, places of interest, film or pop stars, animals or other images of an educational or entertainment nature. A particular image can be selected either by the operation of a switch incorporated in the plug-in module 31 or by the effects switches 32. The image could be printed directly or used as a background over which a captured image could be superimposed.

Figure 5:
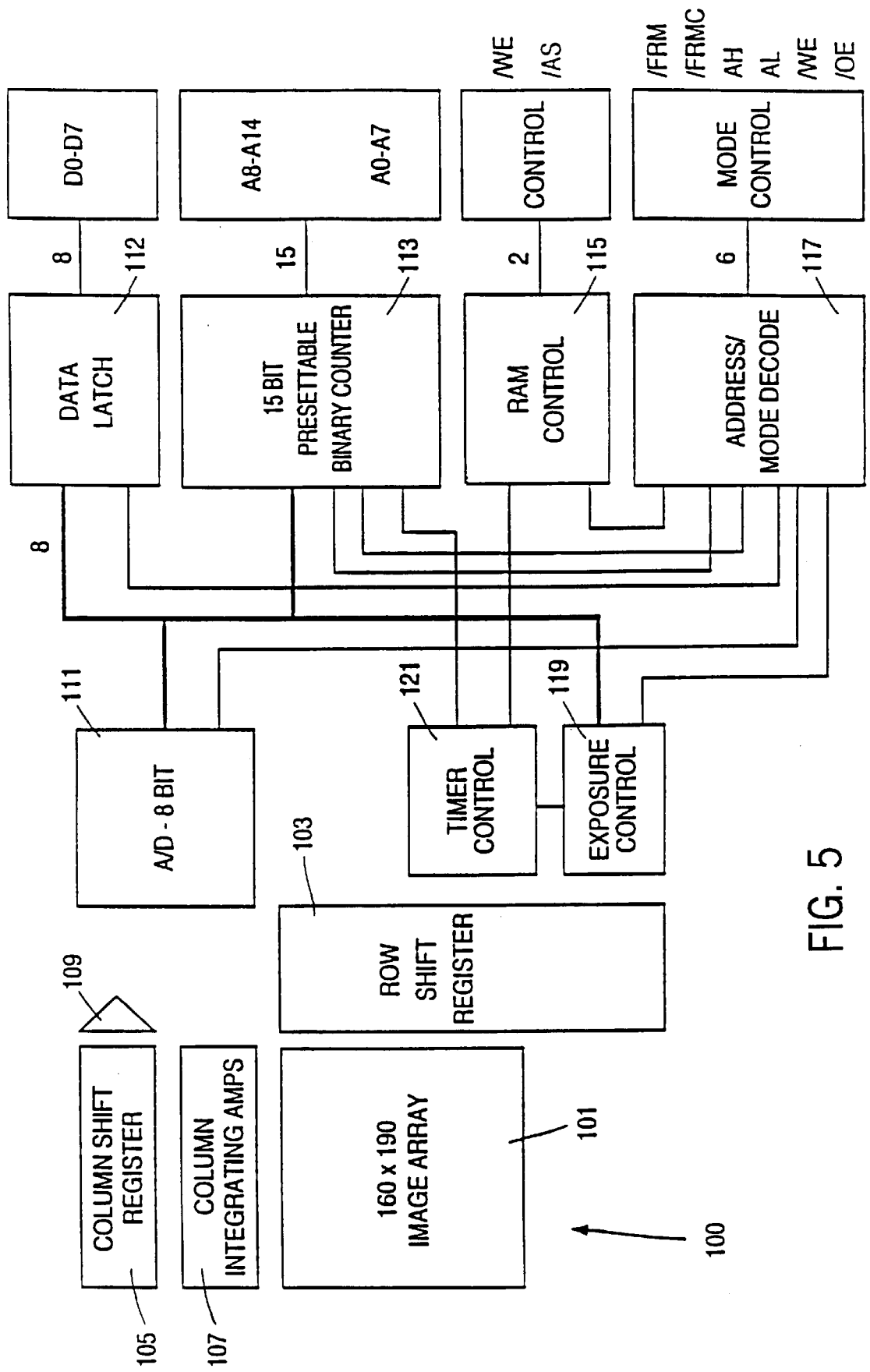
FIG. 5 is a block diagram of a preferred custom imaging sensor.

Turning now to FIG. 5, a block diagram of the preferred custom image sensor is illustrated. Preferably, the image sensor array is constructed in accordance with PCT Published Application No. WO 91/04633 to VLSI Vision Ltd. ("VVL"). A test circuit for such an image sensor array is disclosed in PCT Published Application No. 91/04498. This type of imaging array is available from VVL as part of a monochrome monolithic camera under the trade name ASIS-1070. Customization of the array is available to suit a particular application.

Briefly, unlike the CCD array of FIG. 2, the VVL image sensor array does not utilize vertical shift registers to clock the data to an output port. Rather, a relatively compact array of pixels is provided with a series of horizontal word lines and vertical bit lines. Each pixel in a row is connected to a common horizontal word line which, in turn, is connected to driver control circuitry such as a shift register. Each vertical column of pixels is connected to a vertical bit line which is coupled to one input of an associated switch sense amplifier. A second input of the switch sense amplifiers is coupled to a switching control circuit. The output terminals of the switch sense amplifiers are connected to a common read-out line. In operation, the signals from the photosensors are effectively sequentially multiplexed onto the read out line through the switch sense amplifiers under direction of the driver control circuitry and the switching control circuit. For a more detailed description of such an image sensor array and its operation, reference may be had to the published VVL patent applications.

FIG. 5 illustrates a modified version of the VVL ASIS-1070 that forms an image sensor 100. The sensor 100 includes an image array similar to the ASIS-1070 image array, together with all the timing logic to control the array. In addition to the imaging array, the sensor 100 includes an analog to digital converter and all the logic necessary to interface with static RAM and a microcontroller. The design of the image sensor array is intended to allow the use of a low pin count, low cost microcontroller to process the image data and control the printer. The sensor array interface supports a minimum pin count interface between a system microcontroller and the system peripherals by combining the address and data bus and decoding the high and low address locally to the peripherals. The image is stored in static RAM and is accessed using a multiplexed address/data bus to provide an interface with the microcontroller.

An array 101 of photosensors having an array size, for example, of 160×190 pixels, is provided with associated control circuits and switch sense amplifiers. In operation, row shift register 103 and column shift register 105 sequentially switch the data from the individual pixels through a bank of integrating amplifiers 107 to an output terminal 109. An eight bit analog to digital converter 11 digitizes the pixel data into eight bit data, and places the data in parallel on a data bus $D_0$–$D_7$ through a bi-directional data latch 112. A fifteen bit presettable binary counter 113 is provided to generate address signals for the individual data words on address bus $A_0$–$A_7$, $A_8$–$A_{14}$. A RAM interface is provided for write enable (WE) and address strobe (AS) signals which control transfers between the image sensor array and the system memory. The interface between the image sensor array and the RAM is a simple read/write interface using the address strobe line to latch the current address and the write enable line to control the read or write mode. Since the speed of the microcontroller interface will be relatively slow in comparison to the rate at which data becomes available on the multiplexed address/data bus during a read operation, this simple interface permits the use of a low cost RAM.

A mode controller 117 is included to allow the image sensor array to operate in a selected one of several available operating modes, as discussed more fully below. Automatic exposure control logic and timer control circuit 121 are provided to control the sensor exposure time and to synchronize system operation. The use of electronic exposure control circuit 119, which operates over a relatively wide range, permits the camera to use a low cost fixed aperture lens.

Figure 6:
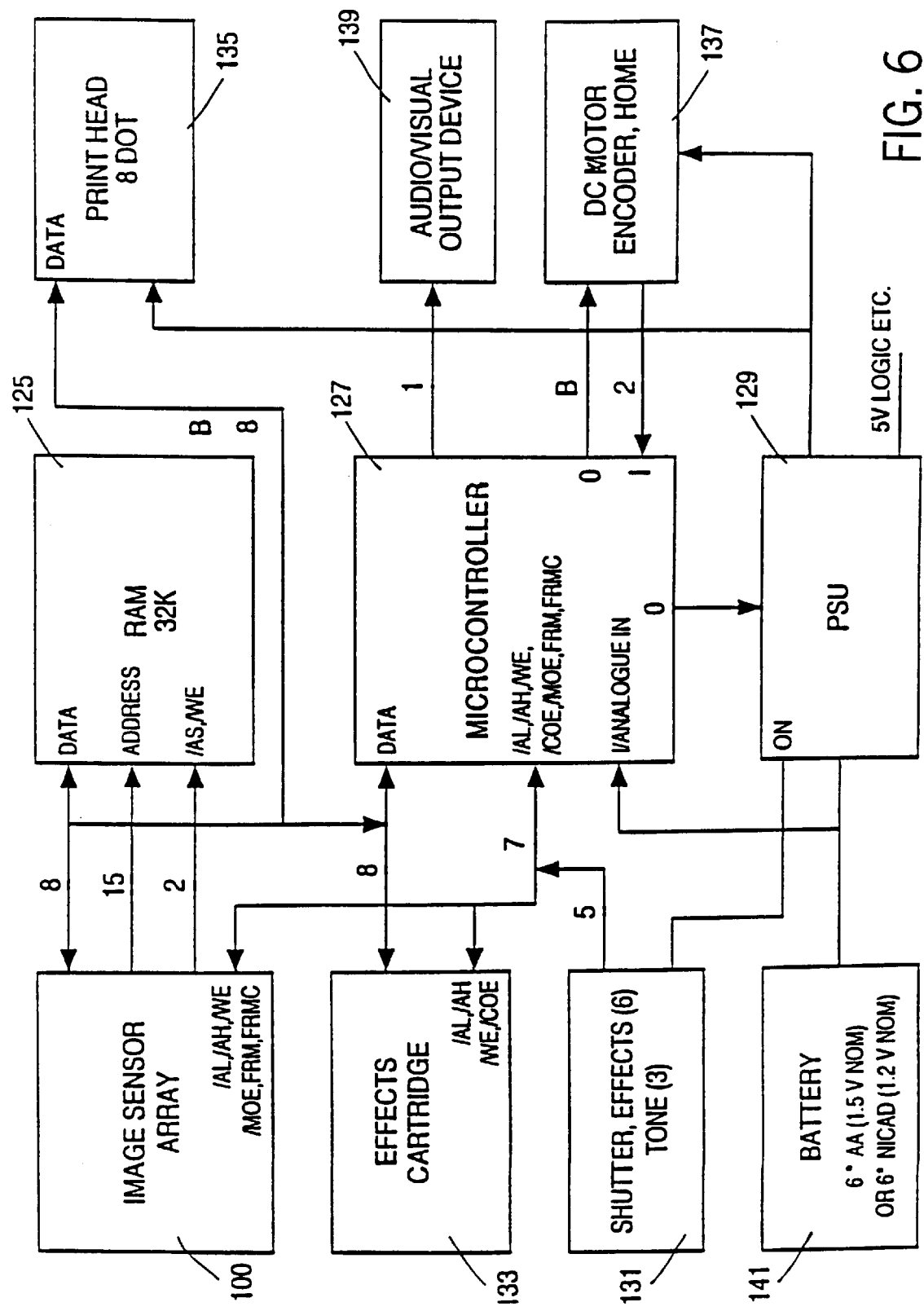
FIG. 6 is a block diagram of a preferred embodiment of an electronic imaging camera using the imaging sensor of FIG. 5.

Turning now to FIG. 6, the image sensor array is arranged in a system including a static RAM 125, a microcontroller 127, and a power supply unit 129. The microcontroller 127 can be, for example, a commercially available Zilog Z86C76 microcontroller. The system also includes a plurality of switches 131 for controlling the shutter as well as the special effects and tone settings. An optional effects cartridge 133 in the form of an insertable memory package may also be provided. An eight dot print head 135 is provided for printing hard copies of images on thermal paper. Alternatively, a dot matrix impact printer, an ink-jet printer, or other appropriate type of printer may be used. Movement of the print head and paper transport are controlled by a DC motor encoder 137. An audio/video output device 139 allows a user to monitor system operation through audible tones and/or a visible display such as an LCD screen or indicator lights. Additionally, a low cost electronic view finder could be provided which may be driven from either the microcontroller or the memory. The system may be powered by a battery 141, which may take the form, for example, of 6 AA cells (1.5 V nominal) or 6 NiCad rechargeable cells (1.2 V nominal).

In operation, the raw image is stored in the static RAM 125 by the image sensor array 100. The image may then be accessed using a multiplexed 8 bit address/data bus to provide the interface of the RAM 125 to the microcontroller 127 via the image sensor array 100. This interface allows the system to use a low pin count, low cost microcontroller such as the Zilog Z86C76. The microcontroller 127 processes the raw image data and converts it from the original 8 bit gray scale 190×160 resolution to a 2 bit gray scale 380×320 resolution image suitable for printing. The converted image is stored in the static RAM 125, and may be retrieved and combined with overlays and effects stored either internally within the microcontroller or externally in an optional effects cartridge 133. The effects cartridge 133 is preferably accessed using the same multiplexed address/data bus used for communications with the image sensor array 100 and the static RAM 125.

The microcontroller interface with the print subsystem includes a buffered 8 bit interface to the print head 135, and the DC motor control, optical encoder feedback and home sensor feedback 137. The thermal print head 135 is preferably a passive print head including eight dots each of approximately 35 ohms. The print head is controlled using an eight bit data latch to connect print data to the print head and to provide sufficient drive capability to place an NPN transistor into saturation to thereby turn on the individual print dots. The single transistor drive provides a benefit by reducing voltage requirements, in relation to Darlington pair transistors, to ensure maximum voltage across the print head. The print head interface writes to the latch by writing the required pattern to the address/data bus and driving the clock line of the latch high. If individual bits of the print head are required to be turned off earlier than others, then the latch can be rewritten with a new value at any time. At the completion of the print strobe time, all bits will be written to zero.

The DC motor interface is linked to the encoder feedback to provide speed control of the DC motor using a pulse width modulated (PWM) system. During the printing cycle, the microcontroller will control the speed of the print head by reference to rotary encoder pulses fed back from an IR phototransistor that senses the position of the print head. These pulses are used to pulse width modulate the DC motor to maintain a constant speed at the print head, and to synchronize the print head strobe with the print head position to ensure good print registration. In addition to the encoder feedback, a home position sensor will provide a feedback to allow a mechanical registration at the start of each print line. As described below in greater detail, in accordance with one aspect of the present invention the encoder feedback and home position sensor may be advantageously be combined to utilize a single phototransistor detector.

The DC motor will be turned on at the maximum pulse width (controlled by an internal timer interrupt) until the time between the encoder pulses is within a set range. If the time between encoder pulses becomes too short, then the motor will be slowed by increasing the amount of OFF time in the pulse code modulation. Conversely, if the time is too long, then the motor speed will be increased by increasing the ON time of the modulation signals. The encoder feedback may be used to synchronize the print strobe to the motor position, with an absolute line to line registration being provided by the home sensor input.

The effects cartridge 133 interfaces with the microcontroller 127 through the same multiplexed address/data bus lines through which the image sensor array 100 and the microcontroller 127 interface. A separate effects cartridge enable line is provided to enable the cartridge interface. This allows the system to distinguish between accesses to the RAM 125 through image sensor 100 and accesses to the effects cartridge ROM pack. Internally, the effects cartridge 133 preferably includes two eight bit latches for address data and plurality of ROM memory locations. To access a particular byte stored within the ROM pack, the microcontroller writes the low address byte on the multiplexed address/data bus, followed by the high address byte, and will then read back the data. If consecutive bytes are required, then the minimum operation will be to rewrite the low address bytes and read back the data. In the preferred embodiment, the high and low address bytes allow up to a 16 bit addressing range within the cartridge. Thus, the cartridge may store up to 64 kilobytes of data for use by the microcontroller.

The microcontroller 127 interfaces with the user through a series of switches 131, including the shutter button, a repeat picture button, and the effects cartridge selector input. The shutter button is connected to both the power supply and the microcontroller so that when the system is powered down, pressing the shutter button will power the system and take a picture. If the system is already turned on, pressing the shutter will simply take another picture. The repeat picture button will operate only if pressed within a certain time period after the last picture was taken, for example, 2 minutes. Pressing the repeat picture button within that time period causes the system to reprint the picture with the current effects setting. The effects selection will consist of three binary coded inputs selected by a rotary selector. (See FIGS. 10 and 12).

During operation, the system will produce an audible sound generated from a sound effects device. Preferably, the sound may be produced with a simple single transistor amplifier with a moving coil loudspeaker incorporated in the audio/visual output device 139. It may also be possible to utilize different sound effects to indicate different points in the camera cycle. For example, one sound effect may be used to indicate the picture has been taken or that the camera is taking a picture, and a second sound effect may be used while the camera is processing and printing the image. As an alternative to the sound effects, or in addition to the sound effects, visual indicators such as LED lights or an LCD display may be used to indicate the camera operation.

The microcontroller interface allows control of the image sensor 100 and the static RAM 125 using a number of operation modes. These modes include image control modes and memory control modes. As noted above, the image sensor 100 mode is controlled by the microcontroller through instructions to the address/mode decode logic 117. The imager control modes allow the interface to instruct the image sensor 100 to capture a frame of image data and place the frame in static RAM 125, and to set the exposure value in exposure control 119 following processing of the picture.

The memory control modes allow the microcontroller 127 to access the external RAM 125 via the image sensor using the multiplexed address/data bus. In the simplest form, the read and write mode operates by the microcontroller writing the low address byte followed by the high address byte, and reading back data or write data. The additional memory control modes increase the system efficiency by avoiding the microcontroller rewriting the address bytes. For instance, an RMW mode allows the microcontroller to perform a normal read operation followed by a write operation to the same address. Auto read or write cycles allow the microcontroller 127 to read or write consecutive bytes of the RAM 125 while the binary counter 113 of image sensor 100 automatically increments the address. Thus, blocks of data may be read or written with only the first address being set. Such an arrangement is nearly as efficient as directly accessing the memory 125.

Figure 7:
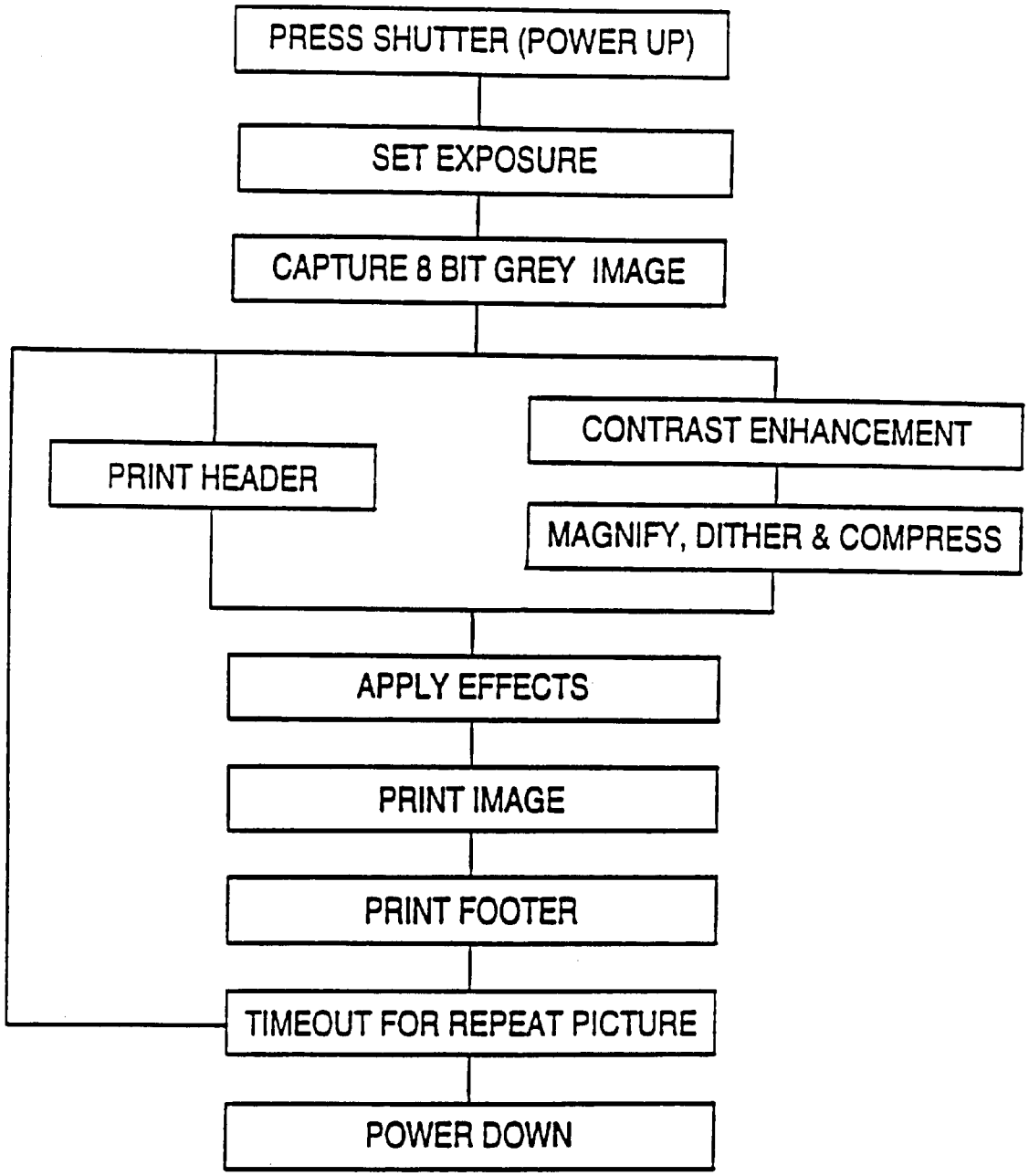
FIG. 7 is a flow chart illustrating the operation of the electronic imaging camera of FIG. 6.

The basic software functions of the electronic camera are illustrated in flow chart form in FIG. 7. Prior to operating the camera, a user should set the three position tone control switch to the desired setting. In normal indoor use, the tone control should be set to medium. For operation in cold conditions such as outdoor winter use, the tone control should be set to dark; and in very hot weather, the light tone control setting should be used. As shown in FIG. 7, camera operation may be initiated by pressing the shutter button to power up the camera. The overall principle of the system is to capture the image as quickly as possible, apply all the standard enhancements and compression to the image, and store the print-formatted image back in the RAM 125 while printing an appropriate picture heading. Finally, the image is rotated as it is removed from the static RAM 125 and printed with the appropriate overlays, scaling, etc. being applied at that time. Finally, a picture footer such as a company logo may be printed. One benefit of the system is an ability to maintain the printable image in RAM 125 such that if another copy of the image is provided within the time-out period, the copies can be produced with alternative effects. A time-out period of approximately two minutes may be used to help conserve battery life.

Once the shutter button is pressed, an electronic exposure control is performed. The exposure control adjusts the pixel exposure time to compensate for reflected light from the main subject of the exposure, and allows the camera to use a low cost fixed aperture lens. The function of the electronic exposure control is discussed more fully in conjunction with FIG. 9.

The objective of the image processing software is to convert the 8 bit gray scale 160×190 image captured by the image sensor 100 into a 2 bit gray scale image at 320×380 resolution, with additional image enhancement to tailor the image for the print subsystem. The image processing consists of several main stages: contrast enhancement of the original data to increase the printed image contrast; magnification of the original image to 320×380 resolution for the printer; dithering and thresholding of the magnified image to reduce each pixel from 8 bit gray scale resolution to 2 bit gray scale resolution; and compression of the image to 4 pixels per byte to allow the image to be stored within the same 30,400 byte image areas as the original 8 bit image.

Since the hardware interface with the external RAM 125 is optimized to allow access to consecutive bytes of stored data, the image processing software preferably utilizes as much internal microcontroller RAM as is available to load pieces of the image, process them, and store them back into the external RAM 125. Assuming, for example, that 160 bytes of internal RAM are available in the microcontroller 127, a block of 40 bytes of original image data may be retrieved from the external RAM 125 for processing. Following magnification, the 40 byte block of image data fills an 80 byte by 2 row block of data, for a total of 160 bytes. After dithering, thresholding and data compression, each 40 bytes of original data becomes two rows of compressed data of 20 bytes each.

Contrast enhancement is applied to the original 40 bytes of image data as they are copied from the external RAM 125 to the microcontroller internal RAM. The contrast enhancement modifies the raw image data by applying a predetermined conversion function to map the raw image data into enhanced contrast data. Magnification increases the image size by converting each pixel of information into four pixels. In other words, the image data for a single pixel in the 160×190 original image is assigned to 2×2 array of pixels in the 320×380 resolution array. The dither algorithm reduces the 8 bit, 256 gray level original image data to 2 bit, 4 gray level data. Preferably, the dither algorithm is based on a Floyd Steinberg Dither algorithm that produces a black and white output. To achieve the reduction in gray scale values, the 8 bit gray scale values x of the image data are compared with the thresholds shown in the following table, and the 2 bit gray scale value is set accordingly.

| Original 8 Bit Gray Scale Value | Resulting 2 Bit Gray Scale Value |
|---|---|
| $0 < X \leq 42$ | 0 |
| $42 < X \leq 127$ | 1 |
| $127 < X \leq 212$ | 2 |
| $212 < X \leq 255$ | 3 |

The resulting 2 bit data is packed into four pixels per byte and stored in the external static RAM 125. To avoid discrepancies in the dither calculation of image data in adjacent blocks of image data, the image data bytes at the right of each processed block are maintained in 8 bit format and are stored separately for use with the adjacent blocks when they are subsequently processed.

The printer control software drives a single DC motor to scan the print head and advance the paper. Synchronized with the print head position, the printer control software controls the data on the print head and the strobe time for the print head. The printer control software runs in parallel with the image processing software so that a header may be printed during image processing. Thus, the printer software is preferably operated under interrupt control.

Figure 8:
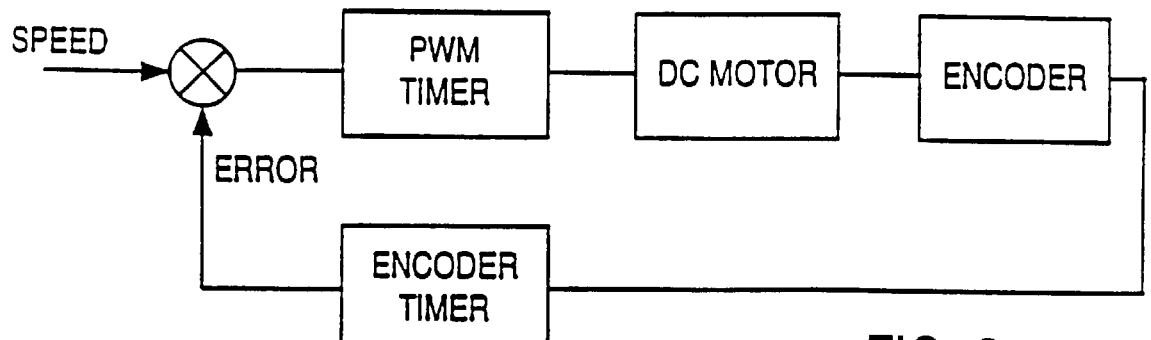
FIG. 8 illustrates a pulse width modulation technique for controlling printing operation.

The DC motor control is preferably a pulse width modulated (PWM) type control system with the feedback performed using a single rotary encoder system. The PWM output is produced with an internal timer set over a range of values dependent on the speed error. The speed error is calculated by the time taken between each encoder pulse. The basic printer control system is shown schematically in FIG. 8.

Print head control is performed by synchronizing the absolute print head position, using the rotary encoder, with the print data. As the print head moves, the encoder is used to synchronize the data being sent to the print head such that every line printed is registered to the previous line. To maintain the registration, the home sensor input is used to provide an absolute print head position feedback at the start of each line. In accordance with one aspect of the present invention, the functions of the home sensor and the rotary encoder may be combined. This aspect of the present invention is discussed in greater detail below.

The print head ON time is controlled using a series of gray scale tables and an offset provided by the tone control position. The start of the ON time for all print dots is synchronized to the encoder feedback. The duration of the ON time for each pixel of the current line is chosen with reference to the required gray level for the pixel and 50% weighting for the gray level of the previous pixel. This ON time is offset with a fixed value determined by the tone control switch position to compensate for ambient temperatures.

As noted previously, special effects are applied to the print-formatted image stored in external RAM 125 as the image is retrieved for printing. A number of special effects are stored in microcontroller ROM and are available with the standard camera. For example, typical effects might include a "dollar bill" overlay to permit a user to print a friend's face on play money; an aquarium overlay; a speech bubble overlay; and a picture frame overlay. Additional effects may be provided by a ROM module in the optional plug-in effects cartridge 133. For example, image scaling factors may be included in a special effect to produce a "fun house mirror" image. To determine the presence of the plug-in effects cartridge 133, a two byte signature is included in the cartridge to be read back at power up. If a cartridge is present, the cartridge effects will be used. Otherwise, the system will default to internal effects.

Each effect will include one or more of the following parts: overlays which are compressed using run length compression; contrast modifiers to modify the contrast algorithm; exposure modifiers to change the average exposure value for long exposure type effects; x-axis image scaling factors for an entire image to produce a stretched or compressed image; x,y coordinate image offsets to allow the entire picture to be offset within an overlay; line scaling factors to be applied line by line; and line offsets for each image line to be used with the line scaling factors. Other possible features which could be provided through the effects cartridge include: a self timer to allow a user to take a self portrait or the like; electronic zoom which expands the center of the captured image to fill the entire picture area; a mirror effect provided by printing only half of the captured image and then repeating this image in reverse; and fading by a complex overlay so that the edge of the picture fades to white. It should be noted that contrast and exposure modifiers will affect the original image and thus will not be adjustable when using the repeat picture functions.

Figure 10:
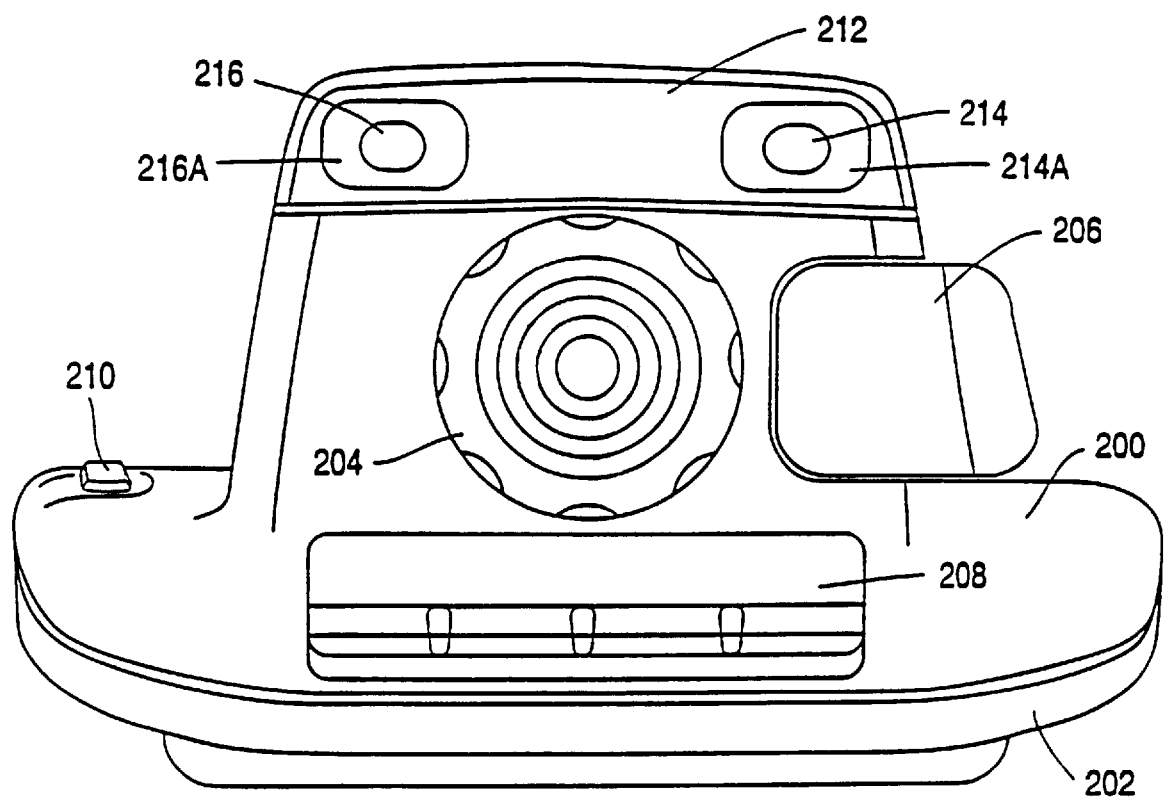
FIG. 10 is a front view of a camera housing for the electronic imaging camera of FIG. 6.
Figure 12:
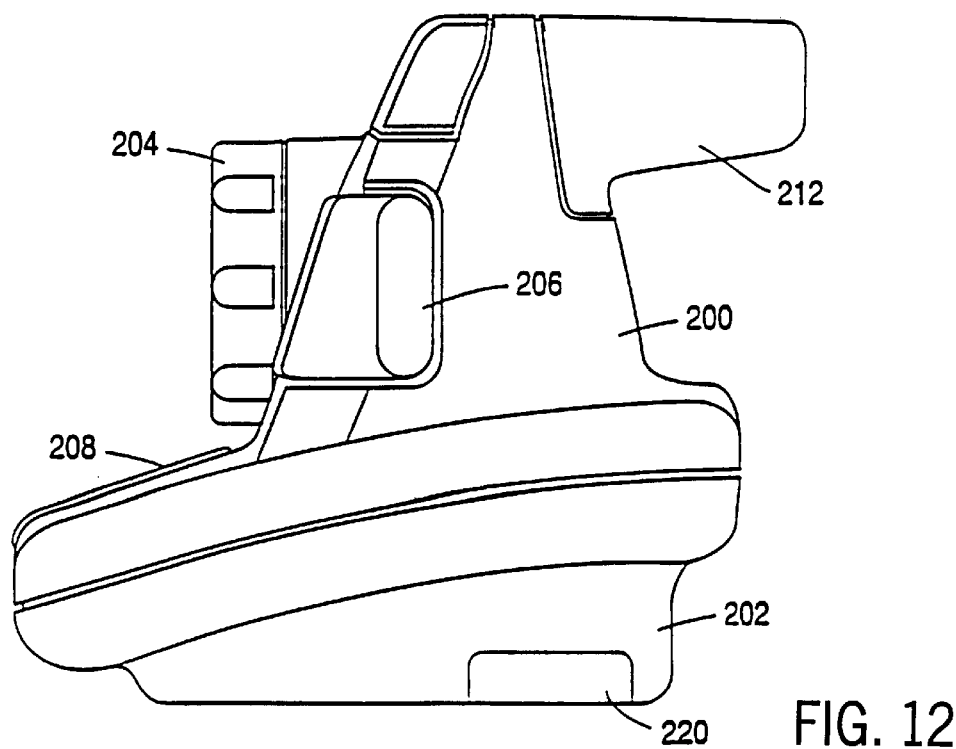
FIG. 12 is a side view of the camera housing of FIG. 9.
Figure 13:
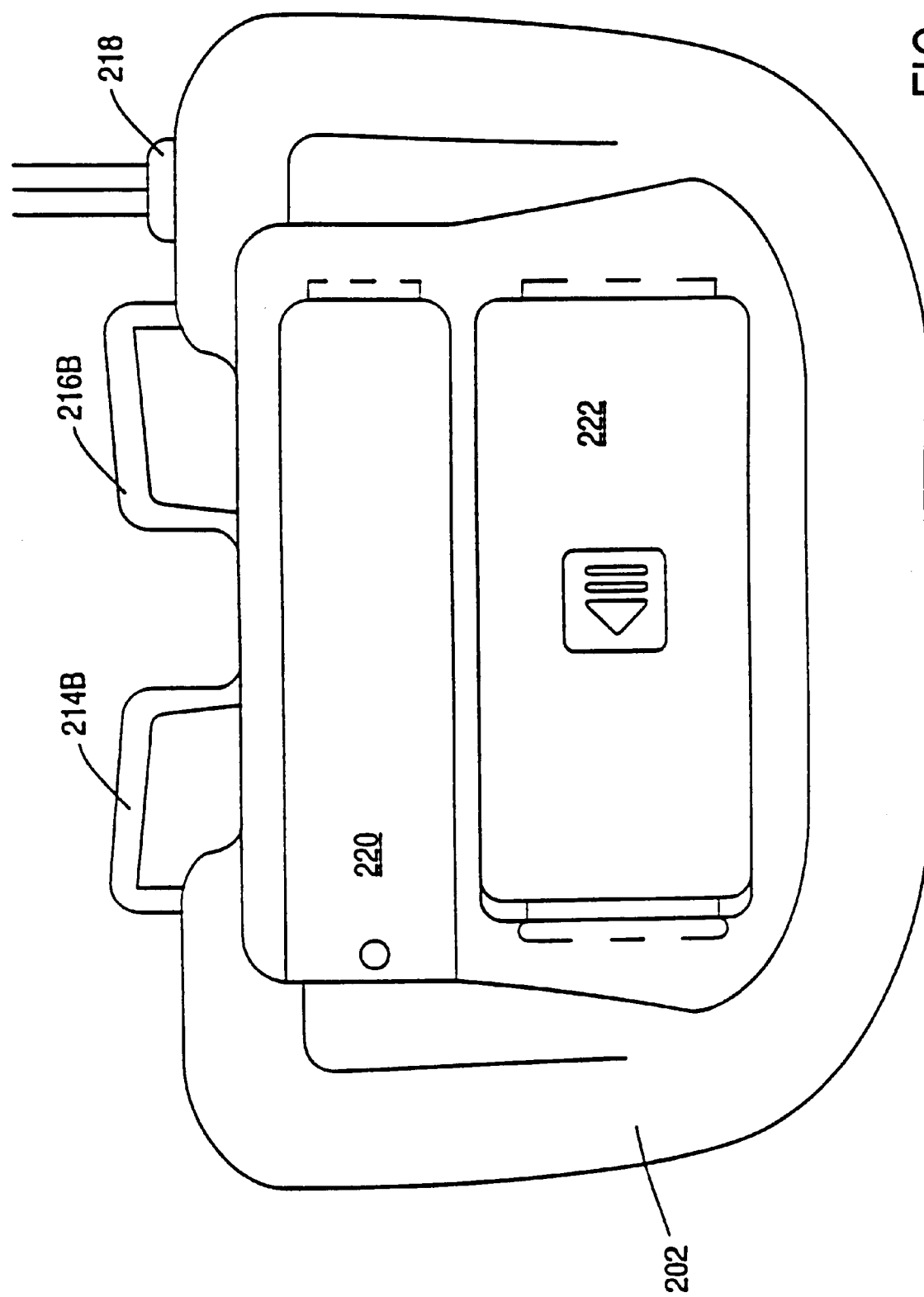
FIG. 13 is a bottom view of the camera housing of FIG. 9.

The effect to be applied, if any, is preferably selected by the user through a rotary switch on the camera housing. The position of the rotary switch sets three binary coded inputs that are read by the microcontroller 127. Such a rotary switch is shown in FIGS. 10 and 12. Preferably, a random setting may also be provided whereby the microcontroller randomly selects one of the available special effects for printing.

Figure 9:
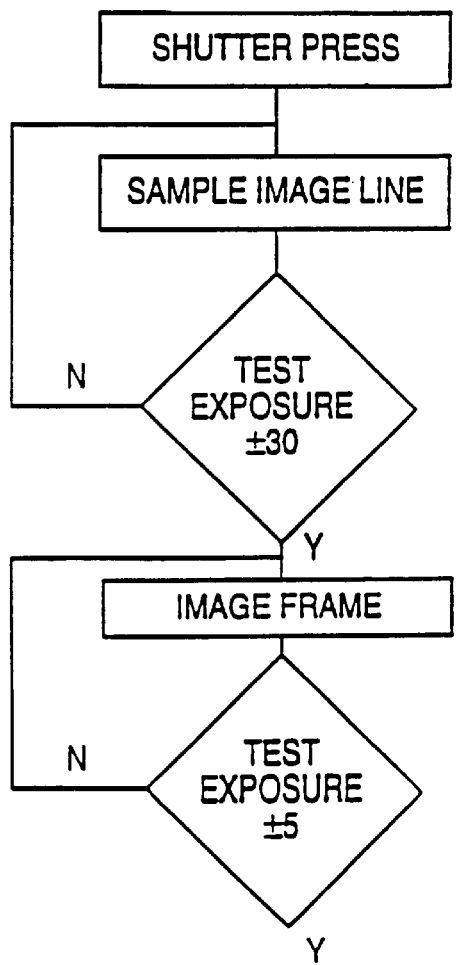
FIG. 9 is a flow chart illustrating an exposure control scheme for use with the electronic imaging camera of FIG. 6.

Turning now to FIG. 9, the exposure control is performed as soon as the shutter button is pressed. The electronic exposure control algorithm performs a first pass using a random line within the captured image. This allows the software to calculate an approximate exposure value without waiting for the entire frame to be captured. This exposure value can then be written directly into the exposure register in exposure control 119 of the image sensor 100 and another frame started. If the random line of the new frame is within the required exposure range, the center of the frame will be used to calculate a more accurate exposure value. If necessary, another frame will be requested to improve the image. When the exposure is within tolerance, the captured image will be further processed and printed.

The exposure calculation may be performed by calculating an average 8 bit gray scale level of all the pixels in the area under consideration. The exposure register contents will be modified from the error between the calculated average gray scale level and the midpoint 8 bit value 128. As a first approximation, the exposure register contents will be set to a center value on power up, and will be modified up or down from that value for a more accurate exposure at the particular light level.

For improved results, the exposure setting may be center weighted within the picture frame such that the exposure will be calculated with respect to the object at the center of the frame. This technique provides several advantages. First, it helps ensure that the exposure is correct for the main subject of the image. Also, calculation of the exposure value will only require a limited number of pixels to be considered and therefore will be much faster. Additionally, the effect of back-lighting/front-lighting will be minimized as only the main subject of the picture will be considered by the algorithm.

The housing for the camera is illustrated in FIGS. 10–13. Referring to the frontal view of FIG. 9, the housing includes a top molding 200 and a bottom molding 202 that may be formed of an appropriate plastic material. A knurled lens ring/effects switch 204 is provided for selecting a special effect from the optional special effects ROM pack 206 or, if no special effects pack is included, from the standard special effects stores in the ROM of the system microcontroller. Rotation of the lens ring 204 sets three binary coded inputs to be decoded by the microcontroller 127. Preferably, a visual indication such as a pointer arrow is provided on the lens ring to indicate the current effects setting.

The upper molding 200 preferably includes a clear plastic cover 208 for the printer paper output. The upper molding 200 and the lower molding 202 are each provided with peripheral gripping portions. A shutter button 210 is arranged on a gripping portion of the upper molding. Additionally, a picture repeat button (not shown) may be provided on the upper molding 200. The top portion of the upper molding 200 receives a view finder molding 212, which provides viewing apertures 214 and 216. The viewing apertures 214 and 216 are preferably covered with clear eye piece moldings 214A and 216A, respectively.

Figure 11:
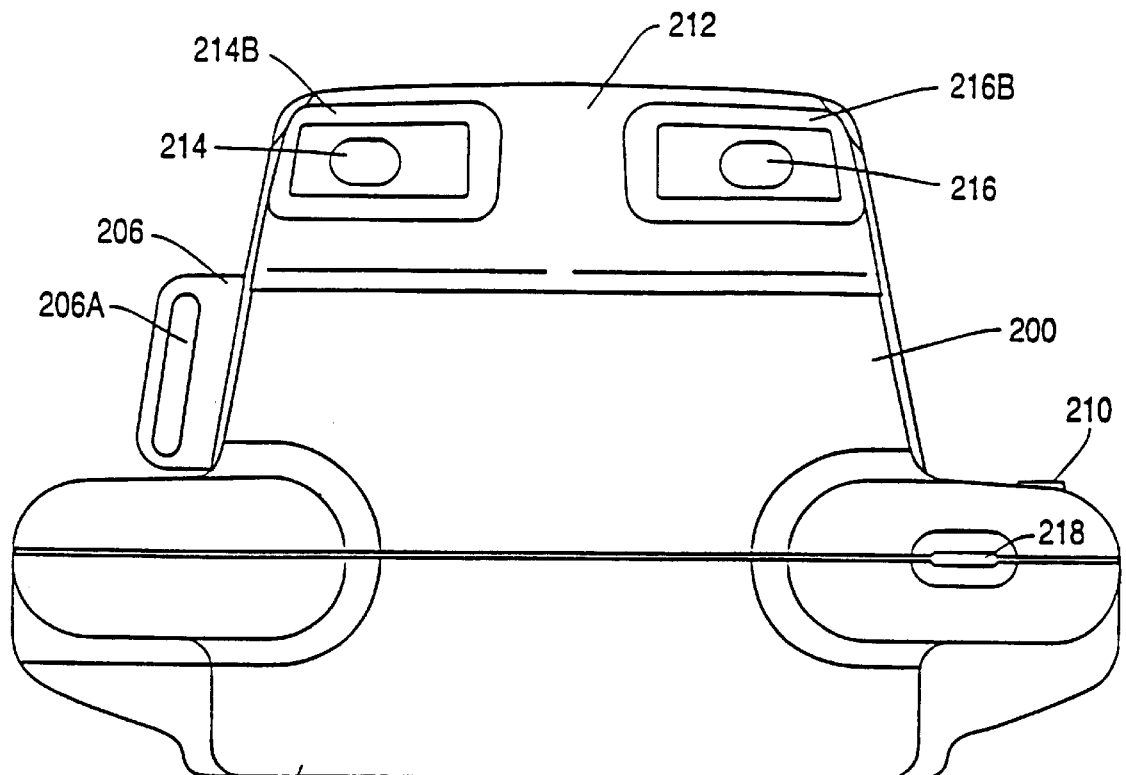
FIG. 11 is a rear view of the camera housing of FIG. 9.

A rear view of the camera housing is illustrated in FIG. 11. The view finder molding 212 includes a pair of eye pieces 214B and 216B associated with viewing apertures 214 and 216, respectively. A connector 218 is provided for attaching a carrying strap (not shown). The rear portion of the special effects ROM pack 206 includes a recessed gripping portion 206A to facilitate removal from the camera body.

Referring to the side view of FIG. 12, the lower molding 202 includes a paper cassette cover 220. Thermal printing paper may be provided in a replaceable cassette which is received in an aperture of the system printer mechanism. A typical paper cassette would include sufficient paper to supply approximately 50 hard copy prints. As shown in the bottom view of FIG. 13, the lower molding 202 includes a battery cover 222 in addition to the paper cassette cover.

The printer assembly and associated paper cartridge are described in connection with FIGS. 14–29. Referring particularly to FIGS. 14–19, the printer assembly 300 includes a chassis formed of a right-hand chassis portion 302 and a left-hand chassis portion 304 assembled, for example, by a plurality of screws. Other assembly techniques, such as a snap fit connection or adhesives, may also be used. A plurality of mounting portions 306 is provided on the chassis for mounting the printer assembly to the inside of the camera housing 200.

Figure 18:
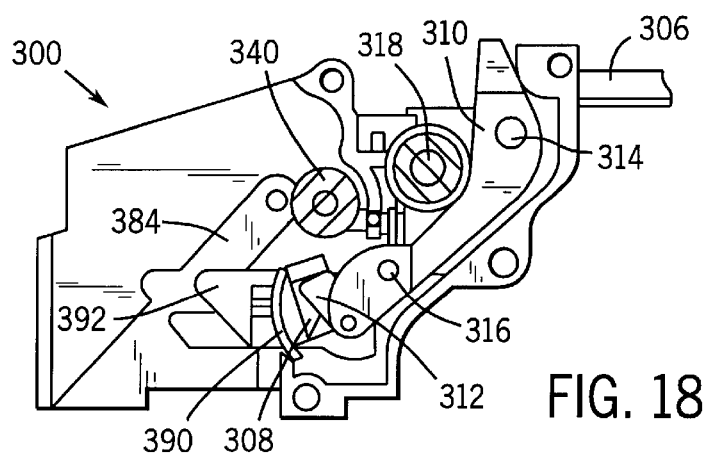
FIG. 18 is a sectional view of the printer assembly of FIG. 14, taken along lines A—A.
Figure 19:
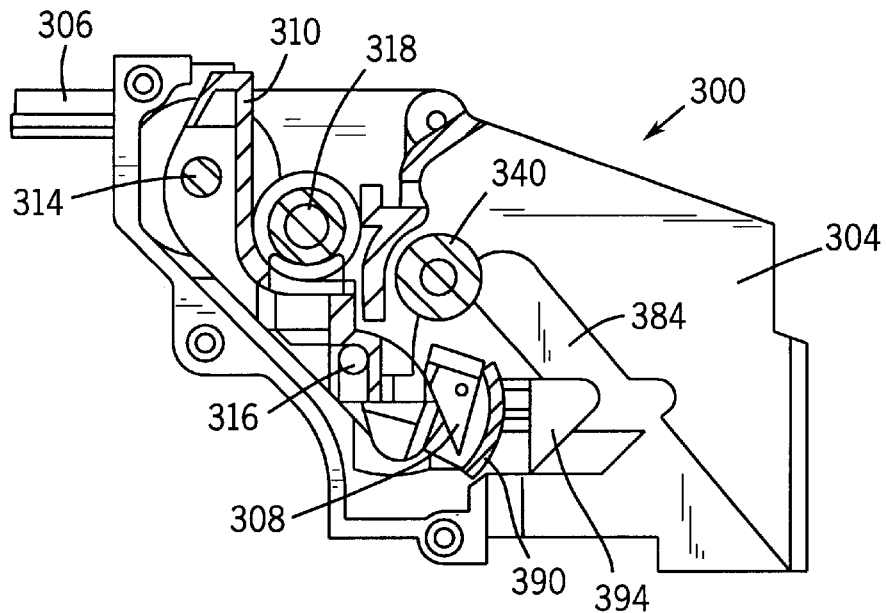
FIG. 19 is a sectional view of the printer assembly of FIG. 14, taken along lines B—B.
Figure 20:
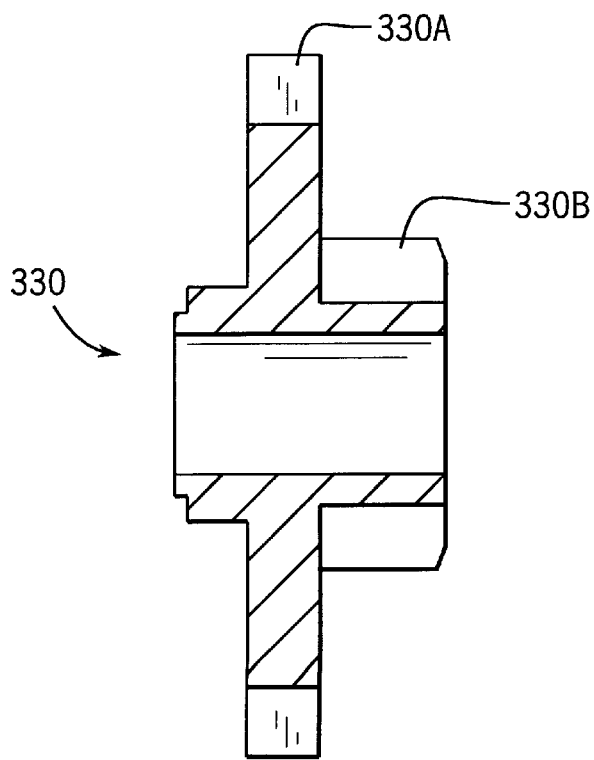
FIG. 20 is a sectional view of a secondary idler gear of the printer assembly of FIG. 14.
Figure 21A:
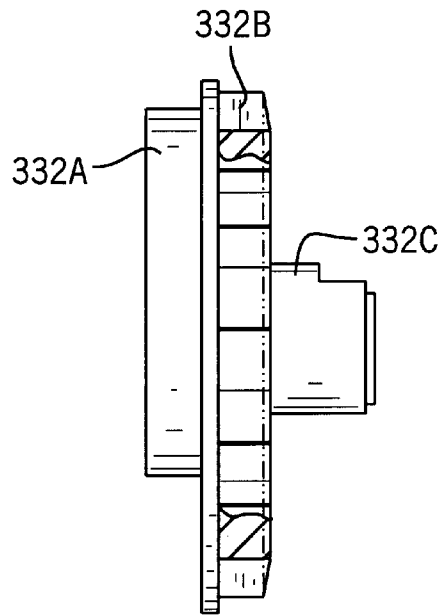
FIG. 21(*a*) is an end view of a geared cam of the printer assembly of FIG. 14.
Figure 21B:
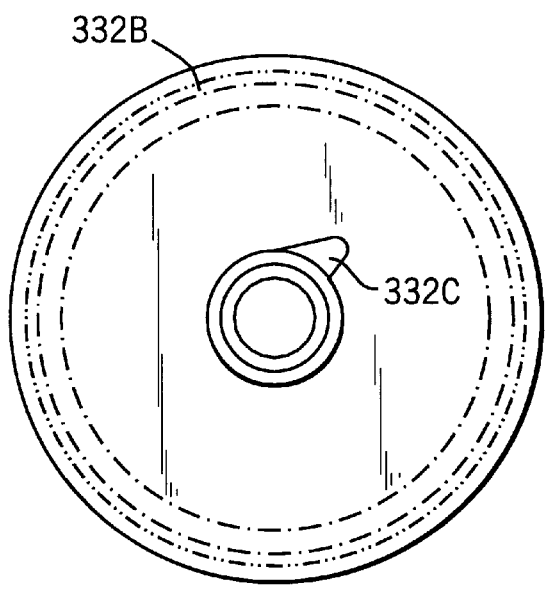

A print head 308 is arranged in a print head carrier 310 having a print head yoke 312 (see FIG. 18). As noted above, the print head is preferably an eight dot thermal print head, although other appropriate types of print heads may also be utilized. The print head is electrically connected to the camera circuitry by a ribbon cable (not shown) which carries the activation signals for the individual print head elements. The print head carrier 310 is slidably mounted on an upper guide rail 314 and a lower guide rail 316, and includes a lead screw guide blade that engages the threads of a bi-directional lead screw roller 318. A primary idler gear 320 couples the lead screw roller 318 to a DC motor 322 through an encoder gear 324 and a motor gear 326. The structure and function of the encoder gear 324 is discussed below in greater detail with reference to FIGS. 24(*a*) and 24(*b*).

As described above in connection with FIGS. 6–8, the DC motor is preferably operated by the microcontroller 127 in accordance with a pulse width modulation (PWM) control scheme. In operation, the DC motor turns the motor gear 326 under control of the microcontroller. The motor gear 326 then drives the encoder gear 324 which, in turn, drives the primary idler gear 320 to rotate the lead screw roller 318. The lead screw guide blade of the print head carrier 310 rides in the lead screw threads to advance the print head 308.

The lead screw roller 318 includes a geared portion at the end opposite primary idler gear 320. The geared portion of the lead screw roller 318 engages a guide rail gear 328 arranged at the end portion of the upper guide rail 314. the guide rail gear 328 includes a first geared portion that engages the geared portion of the lead screw roller 318, and a smaller diameter gear portion that extends through the printer chassis 302. The extended smaller geared portion of the guide rail gear 328 engages a secondary idler gear 330. As shown in greater detail in FIG. 20, the secondary idler gear includes a first geared portion 330A and a second, smaller diameter geared portion 330B. The first geared portion 330A engages the extended geared portion of the guide rail gear 328; and the smaller geared portion 330B of the secondary idler gear meshes with a geared portion of cam 332, shown in greater detail in FIGS. 21(*a*) and 21(*b*). Specifically, the cam 332 includes a cam surface 332A, a geared portion 332B, and a projection 332C provided on the side opposite the cam surface 332A.

Figure 17:
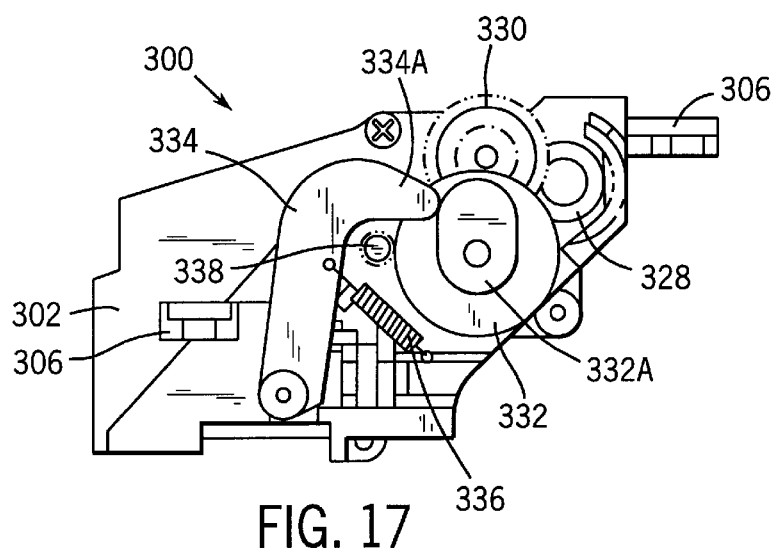
FIG. 17 is a right side view of the printer assembly of FIG. 14.
Figure 22A:
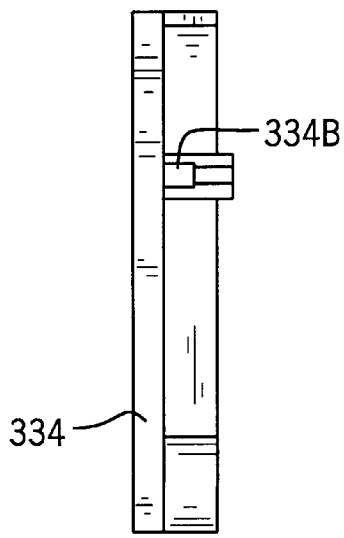
FIG. 22(*a*) is an end view of a pivoting locking arm of the printer assembly of FIG. 14.
Figure 22B:
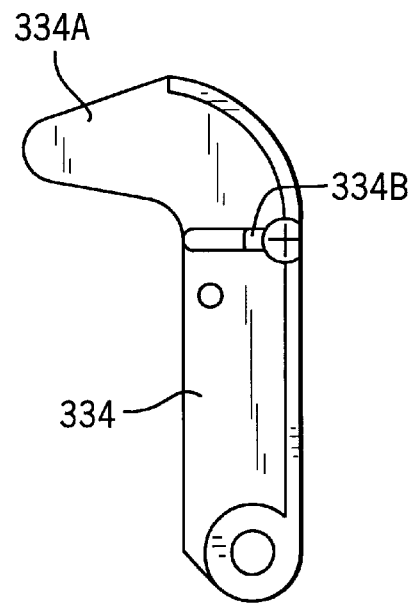
Figure 23:
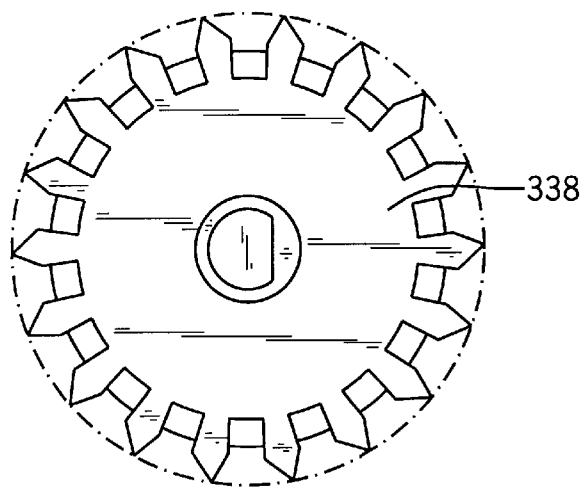
FIG. 23 is a side view of an increment gear of the printer assembly of FIG. 14.

As illustrated in FIG. 17, a locking arm 334 is provided adjacent the cam 332, and includes a cam follower 334A. The locking arm 334 is pivotally mounted on the printer chassis at an end opposite the cam follower 334A. A spring 336 biases the locking arm 334 against the cam 332 to maintain contact between the cam follower 334A and the cam surface 332A. Referring now to FIGS. 22(*a*) and 22(*b*), the locking arm includes a locking projection 334B, which ordinarily engages the teeth of an increment wheel 338 arranged behind bias spring 336 in FIG. 17. Additionally, the projection 332C on the cam 332 is aligned with the teeth of the increment wheel 338. The increment wheel 338, which is shown in greater detail in FIG. 23, is mechanically coupled to a paper advance roller 340. Accordingly, when engaged with the teeth of the increment wheel 338, the locking projection 334B prevents unintended rotation of the paper advance roller 340.

In operation, the DC motor drives the lead screw roller 318 to advance the print head and the cam 332. As the print head nears the end of a line, the cam surface 332A engages the cam follower 334A to pivot the locking arm 334 away from the increment wheel 338 against the force of bias spring 336. The locking projection 334B of the locking arm 334 therefore disengages from the teeth of the increment wheel 338. Further rotation of the cam 332 causes the projection 332C of the cam 332 to engage the teeth of the increment wheel and advance the paper roller 340. Once the paper roller 340 has advanced, the locking arm 334 pivots back into position and engages the increment wheel 338 with locking projection 334B. As a result, further rotation of the paper advance roller is prevented.

Figure 24A:
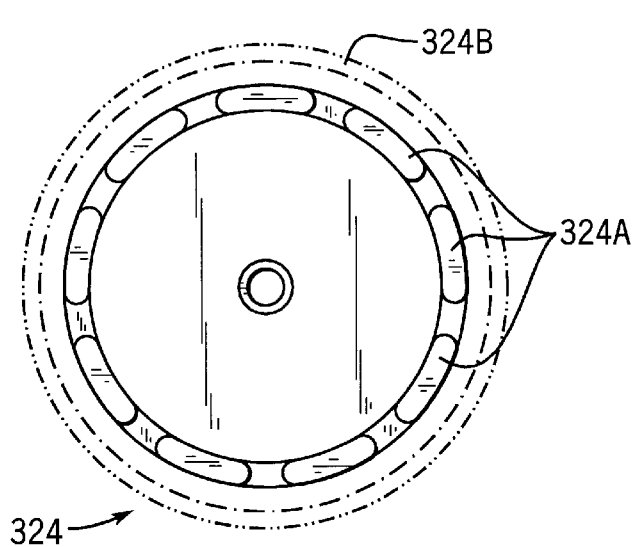
FIG. 24(*a*) is a side view of an encoder gear of the printer assembly of FIG. 14.
Figure 24B:
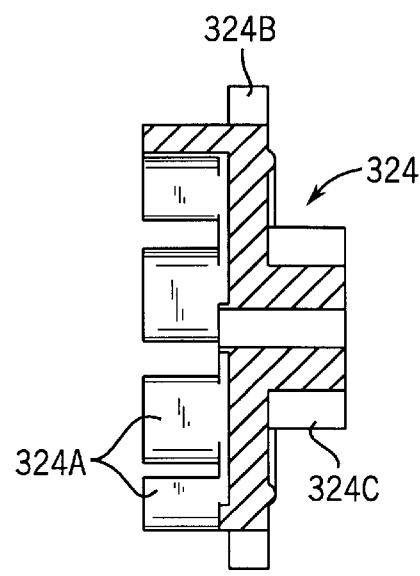

The structure and operation of the encoder gear 324 will now be described with reference to FIGS. 24(*a*) and 24(*b*). The encoder gear 324 includes a plurality of equally spaced lugs 324A that define a series of apertures. These apertures preferably extend toward the printer chassis 304. A geared portion 324B is arranged on the outer periphery of the encoder gear to engage the drive gear of the DC motor 322. A second, smaller diameter geared portion 324C is provided on the side of the encoder gear opposite the lugs 324A to engage the primary idler gear 320 for driving the lead screw roller 318. An infra-red light emitting diode (not shown) is mounted on the printer chassis 304 adjacent the outer periphery of the encoder gear 324 and is aligned with the lugs 324A. A phototransistor sensitive to infra-red light from the LED is mounted on the printer chassis adjacent the central axis of the encoder gear 324. As the encoder gear turns, the lugs 324A pass between the LED and the phototransistor so that the phototransistor generates a series of encoder pulses indicative of the speed of the print head. These encoder pulses are fed back to the printer control circuits and used to control PWM signals in the manner explained in connection with FIG. 8.

Figure 25A:
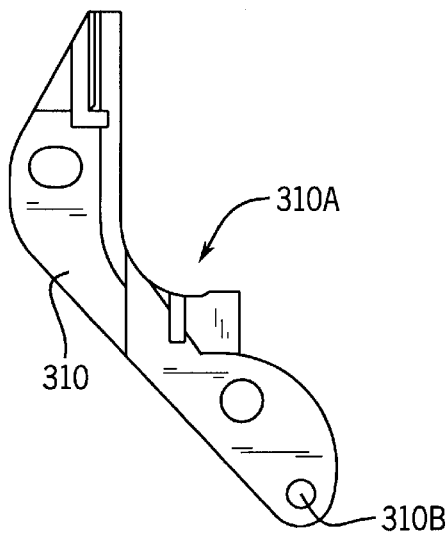
FIG. 25(*a*) is a side view of a print head carrier of the printer assembly of FIG. 14.
Figure 25B:
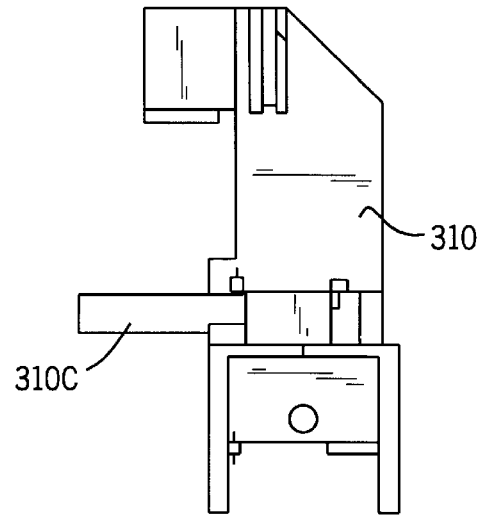
Figure 26A:
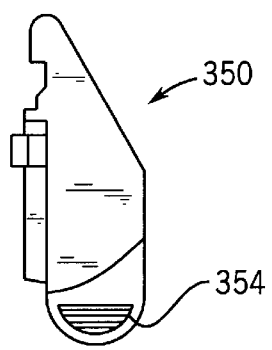
FIG. 26(*a*) is a side view of an upper portion of a paper cassette for use in connection with the printer assembly of FIG. 14.
Figure 26C:
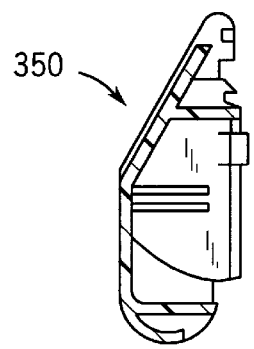
Figure 26B:
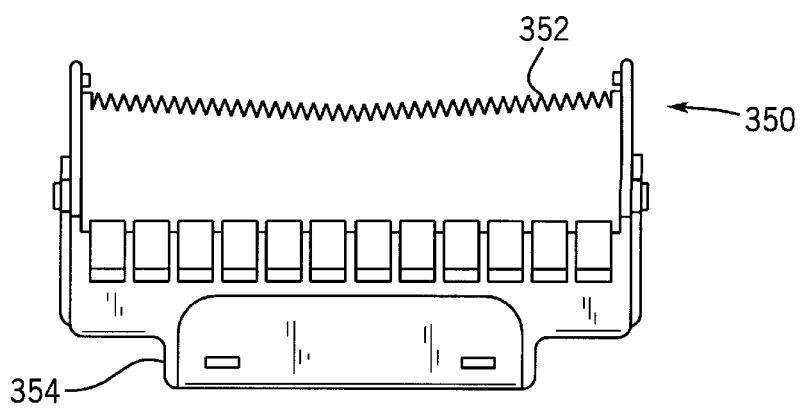
Figure 27A:
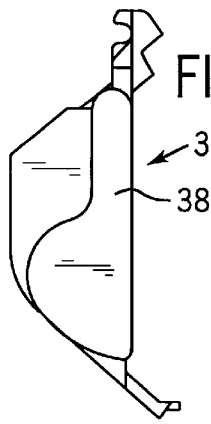
FIG. 27(*a*) is a side view of a lower portion of a paper cassette for use in connection with the printer assembly of FIG. 14.
Figure 27B:
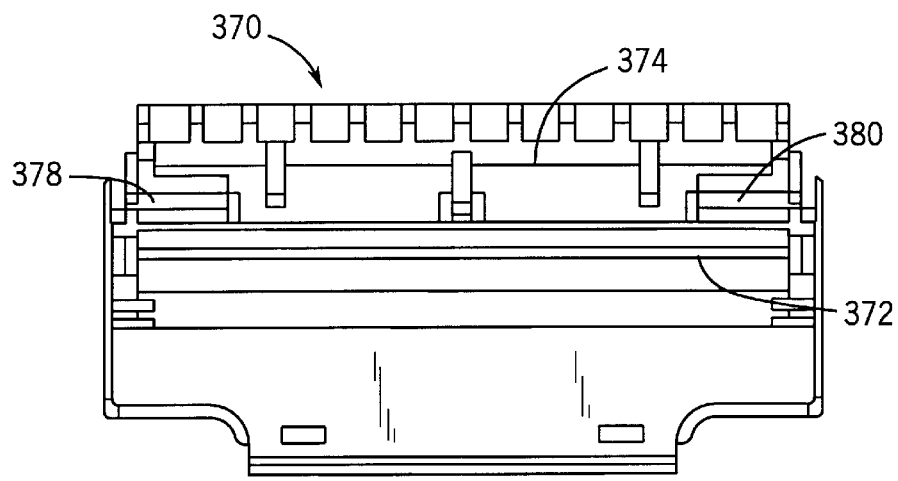
Figure 27D:
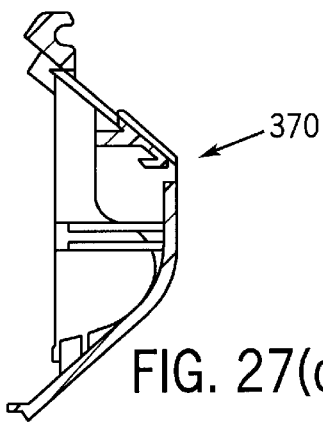
Figure 27C:
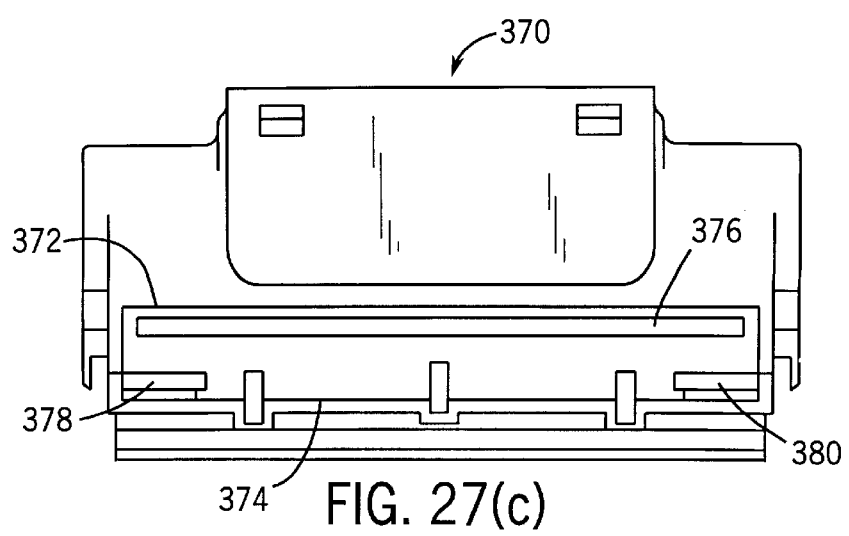

In addition to producing the encoder pulses for print head speed control, the preferred embodiment of the present invention utilizes the LED and the phototransistor to detect when the print head arrives at the home position. Turning now to FIGS. 25(a) and 25(b), the print head carrier 310 includes a first aperture for upper guide rail 314, and a second aperture for guide rail 316 (see FIG. 18). The lead screw guide blade (not shown) is provided in mounting portion 310A. The print head yoke 312 (not shown in FIGS. 25(a) and 25(b)) is pivotally mounted at aperture 310B. An extended tab portion 310C is provided for detecting when the print head reaches the home position. Specifically, with reference to FIGS. 14 and 15, when the print head carrier is in the far left position the tab 310C extends through an aperture in the printer chassis 304 adjacent the encoder gear 324. In this position, the tab prevents light from the LED from reaching the phototransistor. As a result, the series of encoder pulses stops, and an end of line condition is detected. The detection of home position allows a mechanical registration at the start of each print line.

The preferred embodiment includes a paper cassette which is inserted in the printer assembly prior to use. FIGS. 26(a) through 27(d) illustrate the preferred cassette structure. Specifically, the cassette includes an upper portion 350 and a mating lower portion 370 that are snap fit together during assembly. Other techniques for assembling the cassette portions may also be used. A roll of printing paper, such as thermally sensitive paper is arranged between the upper and lower portions prior to assembly, and a leading edge of the paper is threaded through a first guide slot 372 in the lower portion 370. The paper is then threaded through a second guide slot 374 after passing over a pressure pad 376 adhesively attached to the lower cassette 370. A pair of rollers (not shown) is provided on an axle arranged in the inner portion of the lower cassette 370. These rollers partially extend through roller windows 378 and 380 in the lower cassette 370. Each side of the lower cassette includes an exterior rail 382 to guide the cassette into the printer assembly, as described in greater detail below.

When assembled, the guide slot 374 is located adjacent an arcuate row of cutting teeth 352 on the upper cassette 350. The arcuate shape of the row of cutting teeth helps ensure proper tearing of the paper after an image is printed. Other techniques for cutting the paper, such as a slidable cutting blade, could also be used. The upper cassette also includes a gripping portion 354 to facilitate insertion and removal of the paper cassette into the printer assembly. Once an empty cassette is removed from the printer assembly, it may be replaced by a new cassette. Alternately, the empty cassette could be opened to permit preloading of a new roll of paper.

Referring back to FIGS. 18 and 19, the printer chassis includes a pair of opposed cassette receiving slots 384. To insert a new cassette into the printer assembly, the user opens the cassette cover 222 of the housing 200 to gain access to the printer assembly. The user grasps the cassette at gripping portion 354 as the cassette is inserted. The cassette is guided into position in the printer assembly by exterior rails 382 of the cassette and receiving slots 384 of the printer chassis. When the cassette is in position, the preloaded paper is pressed between the pressure pad 376 and the print head 308. Thus, the cassette acts as a platen for the print head 308. Additionally, the rollers of the lower cassette press the paper against the paper advance roller 340 of the printer assembly. Friction between the paper advance roller 340 and the paper causes the paper to move forward when the paper advance roller 340 is turned by the increment gear 338. As the paper advances, it travels past the arcuate row of cutting teeth 352 toward the paper output cover 208 in the housing 200. When a complete image is printed, the user opens the paper output cover 208 and pulls the paper against the cutting teeth 352.

Figure 14:
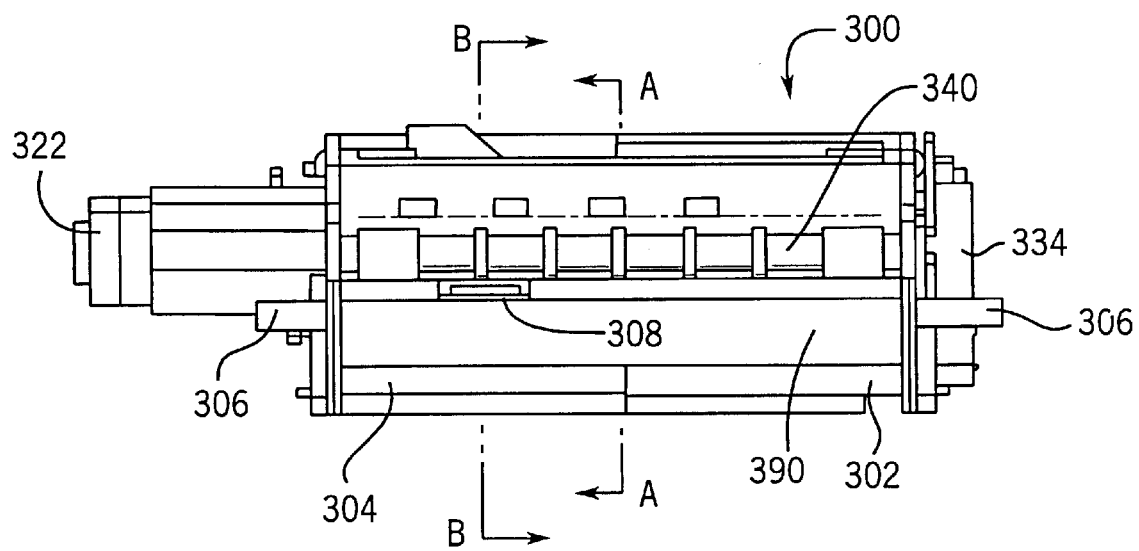
FIG. 14 is a front view of a printer assembly in accordance with the preferred embodiment of the present invention.
Figure 15:
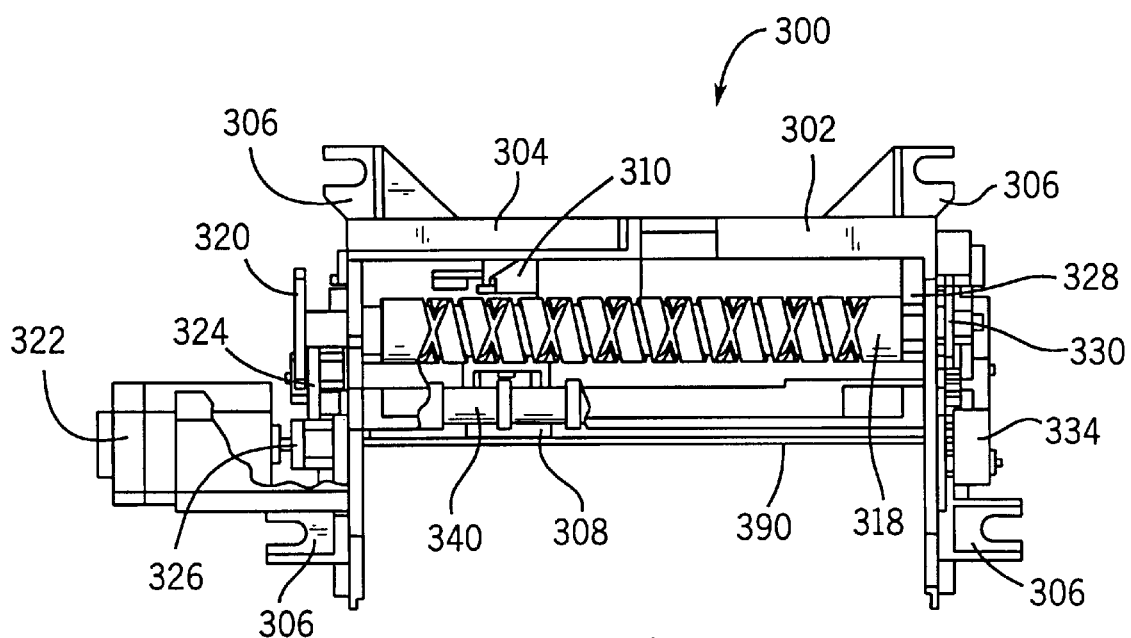
FIG. 15 is a top view of the printer assembly of FIG. 14.
Figure 16:
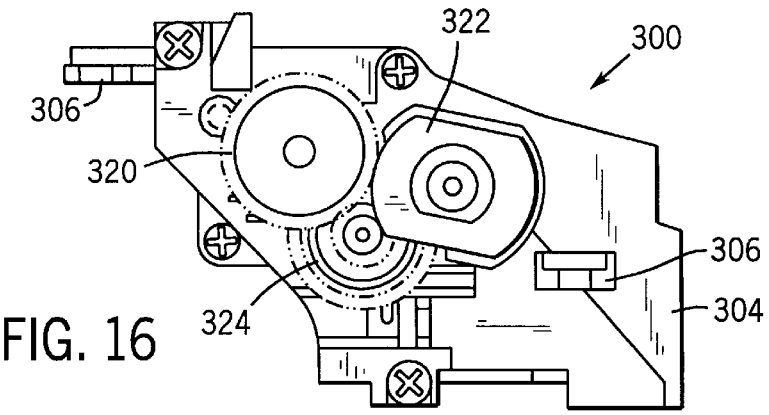
FIG. 16 is a left side view of the printer assembly of FIG. 14.

Because the platen has been removed from the printer assembly and incorporated into the printer cassette, the thermal print head may be somewhat exposed when no cassette is in place. To minimize any risk that the print head would be inadvertently contacted by a user's finger, a print head cover is preferably incorporated into the printer assembly. As illustrated in FIGS. 14 and 15, a pivoting print head cover 390 is provided to block access to the print head 308 when no paper cassette is in place. Referring now to FIG. 18, a sliding actuator 392 is provided on the left hand printer chassis 304 to pivot the print head cover out of the way upon insertion of the paper cassette. Similarly, a corresponding sliding actuator 394 (FIG. 19) is provided on the right hand printer chassis 302. As a cartridge is inserted into the printer assembly, the exterior rails 382 ride in receiving slots 384 and engage the print head cover actuators 392 and 394. The print head actuators are thereby forced out of the receiving slots 384, causing the print head cover 390 to pivot away from the print head. Each actuator is provided with a bias spring (not shown) to pivot the print head cover 390 toward the print head 308 when the paper cassette is removed.

Figure 28A:
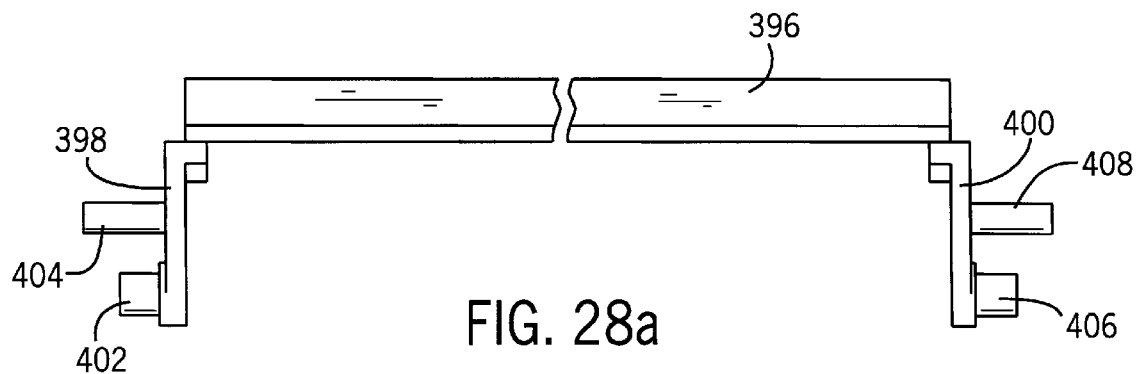
FIG. 28(*a*) is a top view of a print head cover of the printer assembly of FIG. 14.
Figure 28B:
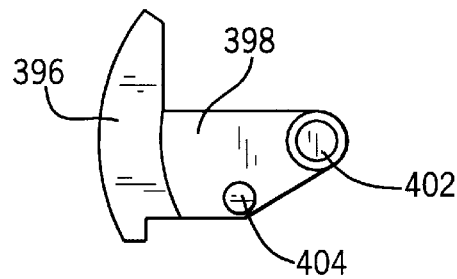
Figure 29:
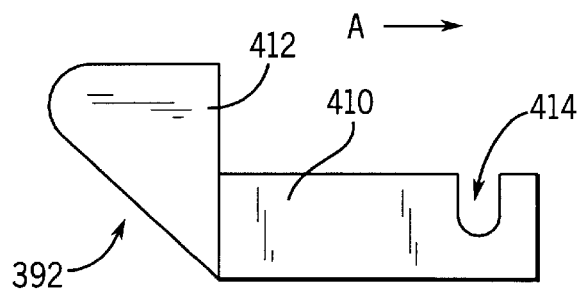
FIG. 29 is a side view of an actuator for the print head cover of FIG. 28(*a*).

Turning to FIGS. 28(a) and 28(b), the print head cover 390 includes a shield member 396, and a pair of opposed side members 398 and 400. Side member 398 includes a pivot 402 and an actuator engagement rod 404. Similarly, side member 400 includes a pivot 406 and an actuator engagement rod 408. The pivots are mounted to the inner portion of the printer chassis. The structure of the print head cover actuator 392 is illustrated in FIG. 29. The print head cover actuators are preferably formed of a plastic material having a relatively low coefficient of friction. The actuator 392 includes a horizontal side piece 410 and an angled forward portion 412. A retaining slot 414 is provided in the side piece 410. The actuator engagement rod of the print head cover 390 rides in the corresponding actuator retaining slot. Pressure exerted on the angled forward portion 412 of the actuator causes movement in the direction of arrow A in FIG. 29. As the actuator moves in this direction, the wall of the retaining slot 414 urges the engagement rod in the same direction. Referring now to FIG. 28(b), as the engagement rod 404 moves toward the right hand side of the Figure, the side member 398 pivots downwardly about pivot 402. As a result, the shield 396 is moved away from the print head 308.

The principles, preferred embodiments and modes of operation of the present invention have been described in the foregoing specification. The invention which is sought to be protected herein, however, is not to be considered as limited to the particular forms disclosed, since these are to be regarded as illustrative rather than restrictive. Variations and changes may be made by those skilled in the art without departing from the spirit of the invention.

What is claimed is:

1. An electronic camera for providing instant hard copy pictures, comprising:

an image sensor including a plurality of photosensors arranged in an array for providing analog image data outputs proportional to the intensity of light incident on the respective photosensors;

processing circuitry coupled with said image sensor, said processing circuitry operable to process image data from said image sensor and to prepare said image data for printing;

a printer assembly including a print head which operates under control of said processing circuitry to provide a hard copy picture; and a replaceable preloaded paper cassette adapted for insertion in said printer assembly, said paper cassette being structured such that preloaded paper is disposed between the print head of said printer assembly and a cassette housing when the cassette is inserted into the printer assembly so that an exterior portion of the cassette housing operates as a printing platen.

2. The electronic camera of claim 1, wherein said printer assembly further comprises a paper advance roller and wherein said paper cassette includes at least one roller which urges said paper against said paper advance roller.

3. The electronic camera of claim 1, wherein said paper cassette includes a gripping portion.

4. An electronic camera for providing instant hard copy pictures, comprising:

an image sensor including a plurality of photosensors arranged in an array for providing analog image data outputs proportional to the intensity of light incident on the respective photosensors;

processing circuitry coupled with said image sensor, said processing circuitry operable to process image data from said image sensor and to prepare said image data for printing;

a printer assembly including a print head which operates under control of said processing circuitry to provide a hard copy picture;

a replaceable preloaded paper cassette adapted for insertion in said printer assembly, said paper cassette being structured such that preloaded paper is disposed between the print head of said printer assembly and a cassette housing when the cassette is inserted into the printer assembly so that the cassette housing operates as a printing platen; and a print head cover which shields said print head when said paper cassette is removed from the printer assembly.

5. The electronic camera of claim 4, wherein said printer assembly includes a chassis having slots for receiving said paper cassette, and said paper cassette includes guide rails which are received in said slots upon insertion of the cassette into the printer assembly.

6. The electronic camera of claim 5, wherein said printer assembly further includes at least one print head cover actuator responsive to insertion of a paper cassette into said printer assembly to move said print head cover away from said print head.

7. An electronic camera for providing instant hard copy pictures, comprising:

an image sensor including a plurality of photosensors arranged in an array for providing analog image data outputs proportional to the intensity of light incident on the respective photosensors;

processing circuitry coupled with said image sensor, said processing circuitry operable to process image data from said image sensor and to prepare said image data for printing;

a printer assembly including a print head which operates under control of said processing circuitry to provide a hard copy picture;

a replaceable preloaded paper cassette adapted for insertion in said printer assembly, said paper cassette being structured such that preloaded paper is disposed between the print head of said printer assembly and a cassette housing when the cassette is inserted into the printer assembly so that the cassette housing operates as a printing platen; and a pressure pad mounted on a portion of said cassette housing adjacent said print head when said cassette is inserted in the printer assembly.

8. An electronic camera for providing instant hard copy pictures, comprising:

an image sensor including a plurality of photosensors arranged in an array for providing analog image data outputs proportional to the intensity of light incident on the respective photosensors;

processing circuitry coupled with said image sensor, said processing circuitry operable to process image data from said image sensor and to prepare said image data for printing;

a printer assembly including a moveable print head which operates under control of said processing circuitry to provide a hard copy picture, a rotary encoder gear having a plurality of spaced lugs, a light source arranged on one side of said spaced lugs, and a light detector arranged on the other side of said spaced lugs, said rotary encoder gear operable to rotate at a rate proportional to the print head speed, whereby said spaced lugs move through a light path between said light source and said light detector, said light sensor producing a series of electrical pulses indicative of the print head speed; and a replaceable preloaded paper cassette adapted for insertion in said printer assembly, said paper cassette being structured such that preloaded paper is disposed between the print head of said printer assembly and a cassette housing when the cassette is inserted into the printer assembly so that the cassette housing operates as a printing platen.

9. The electronic camera of claim 8, wherein said print head is arranged on a moveable print head carrier having an extended tab portion, said extended tab portion being positioned to block the light path between said light source and said light detector when said print head carrier is in the home position.

10. A printer comprising:

a printer chassis;

a print head mounted on a moveable print head carrier arranged in said printer chassis;

a paper advance roller arranged in said printer chassis; and a replaceable, preloaded paper cassette for insertion into said printer chassis, said paper cassette including a housing having an exterior portion that operates as a printing platen and at least one roller for urging said paper against said paper advance roller when said paper cassette is inserted into said printer chassis.

11. A printer comprising:

a printer chassis;

a print head mounted on a moveable print head carrier arranged in said printer chassis;

a paper advance roller arranged in said printer chassis;

a replaceable, preloaded paper cassette for insertion into said printer chassis, said paper cassette including a housing having a printing platen and at least one roller for urging said paper against said paper advance roller when said paper cassette is inserted into said printer chassis; and a print head cover arranged in said printer chassis, said print head cover operable to shield said print head when said paper cassette is removed from the printer chassis.

12. The printer of claim 11, wherein said printer chassis includes slots for receiving said paper cassette, and said paper cassette includes guide rails which are received in said slots upon insertion of the cassette into the printer chassis.

13. The printer of claim 12, further including at least one print head cover actuator responsive to insertion of a paper cassette into said printer assembly to move said print head cover away from said print head.

14. A printer comprising:

a printer chassis;

a print head mounted on a moveable print head carrier arranged in said printer chassis;

a paper advance roller arranged in said printer chassis;

a replaceable, preloaded paper cassette for insertion into said printer chassis, said paper cassette including a housing having a printing platen and at least one roller for urging said paper against said paper advance roller when said paper cassette is inserted into said printer chassis; and a rotary encoder gear having a plurality of spaced apertures, a light source arranged on one side of said spaced apertures, and a light detector arranged on the other side of said spaced apertures, said rotary encoder gear operable to rotate at a rate proportional to the print head speed, whereby said spaced apertures move through a light path between said light source and said light detector, said light sensor producing a series of electrical pulses indicative of the print head speed.

15. The printer of claim 14, wherein said moveable print head carrier includes an extended tab portion, said extended tab portion being positioned to block the light path between said light source and said light detector when said print head carrier is in the home position.

16. A paper cassette for use in a printer assembly having a print head and a paper advance roller arranged in a printer chassis, said paper cassette comprising:

a housing including an interior cavity;

a paper supply roll provided in said interior cavity;

a first paper guide slot provided in said housing;

a second paper guide slot provided in said housing, said second paper guide slot being parallel to and spaced from said first paper guide slot;

a platen formed by an exterior portion of said housing between said first and second paper guide slots, so that paper from said paper supply roll can be threaded through said first paper guide slot, across said platen, and through said second paper guide slot.

17. The paper cassette of claim 16, further comprising a pressure pad mounted on said housing at said platen.

18. The paper cassette of claim 16, further comprising at least one roller positioned on the interior portion of said housing and partially extending through a roller window in said housing, said roller window being positioned between said first paper guide slot and said second paper guide slot, said roller operable to urge said paper toward said paper advance roller when said cassette is positioned in a printer assembly.

19. The paper cassette of claim 16, wherein said paper cassette includes guide rails operable to guide said cassette upon insertion of the cassette into a printer chassis.

20. The paper cassette of claim 16, wherein said housing includes a gripping portion.

* * * * *